United States Patent
Ng et al.

(10) Patent No.: US 10,129,524 B2
(45) Date of Patent: *Nov. 13, 2018

(54) DEPTH-ASSIGNED CONTENT FOR DEPTH-ENHANCED VIRTUAL REALITY IMAGES

(71) Applicant: Google LLC, Mountain View, CA (US)

(72) Inventors: Yi-Ren Ng, Palo Alto, CA (US); Eric Cheng, San Francisco, CA (US); Chia-Kai Liang, San Jose, CA (US); Kayvon Fatahalian, Pittsburgh, PA (US); David John Evans, Palo Alto, CA (US); Kira Wampler, Mountain View, CA (US); Kristen Berman, San Francisco, CA (US); Kurt Barton Akeley, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,710

(22) Filed: Feb. 22, 2017

(65) Prior Publication Data

US 2017/0302903 A1    Oct. 19, 2017

Related U.S. Application Data

(63) Continuation-in-part of application No. 13/533,319, filed on Jun. 26, 2012, now Pat. No. 9,607,424.

(51) Int. Cl.
*G06T 15/00* (2011.01)
*H04N 13/128* (2018.01)
(Continued)

(52) U.S. Cl.
CPC .......... *H04N 13/128* (2018.05); *G06F 3/013* (2013.01); *G06F 21/31* (2013.01)

(58) Field of Classification Search
None
See application file for complete search history.

(56) References Cited

U.S. PATENT DOCUMENTS

| 725,567 A | 4/1903 | Ives |
| 4,383,170 A | 5/1983 | Takagi et al. |
| (Continued) | | |

FOREIGN PATENT DOCUMENTS

| DE | 19624421 | 6/1996 |
| WO | 03052465 | 6/2003 |
| (Continued) | | |

OTHER PUBLICATIONS

Williams, L., "Pyramidal Parametrics", Computer Graphics (1983).
(Continued)

*Primary Examiner* — Andrew G Yang

(57) ABSTRACT

According to various embodiments of the invention, a system and method are provided for enabling interaction with, manipulation of, and control of depth-assigned content in depth-enhanced pictures, such as virtual reality images. Depth-assigned content can be assigned to a specified depth value. When a depth-enhanced picture is refocused at a focus depth substantially different from the specified assigned depth value, the depth-assigned content may be omitted, grayed out, blurred, or otherwise visually distinguished. In this manner, content associated with an in-focus image element can be visually distinguished from content associated with an out-of-focus image element. For example, in at least one embodiment, depth-assigned content is visible only when an image element associated with the content is in focus (or nearly in focus). According to various embodiments of the invention, many different types of interactions are facilitated among depth-assigned content, depth-enhanced virtual reality images, and other content.

79 Claims, 14 Drawing Sheets

(51) Int. Cl.
  *G06F 3/01* (2006.01)
  *G06F 21/31* (2013.01)

(56) References Cited

U.S. PATENT DOCUMENTS

| | | |
|---|---|---|
| 4,661,986 A | 4/1987 | Adelson |
| 4,694,185 A | 9/1987 | Weiss |
| 4,920,419 A | 4/1990 | Easterly |
| 5,076,687 A | 12/1991 | Adelson |
| 5,282,045 A | 1/1994 | Mimura et al. |
| 5,610,390 A | 3/1997 | Miyano |
| 5,748,371 A | 5/1998 | Cathey, Jr. et al. |
| 5,757,423 A | 5/1998 | Tanaka et al. |
| 5,907,619 A | 5/1999 | Davis |
| 5,949,433 A | 9/1999 | Klotz |
| 6,005,936 A | 12/1999 | Shimizu et al. |
| 6,023,523 A | 2/2000 | Cohen et al. |
| 6,028,606 A | 2/2000 | Kolb et al. |
| 6,091,860 A | 7/2000 | Dimitri |
| 6,097,394 A | 8/2000 | Levoy et al. |
| 6,201,899 B1 | 3/2001 | Bergen |
| 6,320,979 B1 | 11/2001 | Melen |
| 6,466,207 B1 | 10/2002 | Gortler et al. |
| 6,483,535 B1 | 11/2002 | Tamburrino et al. |
| 6,577,342 B1 | 6/2003 | Wester |
| 6,597,859 B1 | 7/2003 | Leinhardt et al. |
| 6,606,099 B2 | 8/2003 | Yamada |
| 6,785,667 B2 | 8/2004 | Orbanes et al. |
| 6,833,865 B1 | 12/2004 | Fuller et al. |
| 6,842,297 B2 | 1/2005 | Dowski, Jr. et al. |
| 6,900,841 B1 | 5/2005 | Mihara |
| 6,927,922 B2 | 8/2005 | George et al. |
| 7,034,866 B1 | 4/2006 | Colmenarez et al. |
| 7,079,698 B2 | 7/2006 | Kobayashi |
| 7,336,430 B2 | 2/2008 | George |
| 7,620,309 B2 | 11/2009 | Georgiev |
| 7,623,726 B1 | 11/2009 | Georgiev |
| 7,748,022 B1 | 6/2010 | Frazier |
| 7,945,653 B2 | 5/2011 | Zuckerberg et al. |
| 7,949,252 B1 | 5/2011 | Georgiev |
| 8,155,478 B2 | 4/2012 | Vitsnudel et al. |
| 8,290,358 B1 | 10/2012 | Georgiev |
| 8,724,014 B2 | 5/2014 | Ng et al. |
| 2002/0001395 A1 | 1/2002 | Davis et al. |
| 2002/0015048 A1 | 2/2002 | Nister |
| 2002/0159030 A1 | 10/2002 | Frey et al. |
| 2002/0199106 A1 | 12/2002 | Hayashi |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0156077 A1 | 8/2003 | Balogh |
| 2004/0114176 A1 | 6/2004 | Bodin et al. |
| 2004/0135780 A1 | 7/2004 | Nims |
| 2004/0257360 A1 | 12/2004 | Sieckmann |
| 2005/0031203 A1 | 2/2005 | Fukuda |
| 2005/0052543 A1 | 3/2005 | Li et al. |
| 2005/0080602 A1 | 4/2005 | Snyder et al. |
| 2006/0130017 A1 | 6/2006 | Cohen et al. |
| 2006/0248348 A1 | 11/2006 | Wakao et al. |
| 2007/0008317 A1 | 1/2007 | Lundstrom |
| 2007/0030357 A1 | 2/2007 | Levien et al. |
| 2007/0071316 A1 | 3/2007 | Kubo |
| 2007/0113198 A1 | 5/2007 | Robertson et al. |
| 2007/0188613 A1 | 8/2007 | Nobori et al. |
| 2007/0230944 A1 | 10/2007 | Georgiev |
| 2007/0252074 A1 | 11/2007 | Ng et al. |
| 2007/0269108 A1 | 11/2007 | Steinberg et al. |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0049113 A1 | 2/2008 | Hirai |
| 2008/0131019 A1 | 6/2008 | Ng |
| 2008/0144952 A1 | 6/2008 | Chen et al. |
| 2008/0152215 A1 | 6/2008 | Horie et al. |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0226274 A1 | 9/2008 | Spielberg |
| 2008/0266655 A1 | 10/2008 | Levoy et al. |
| 2008/0309813 A1 | 12/2008 | Watanabe |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0102956 A1 | 4/2009 | Georgiev |
| 2009/0128658 A1 | 5/2009 | Hayasaka et al. |
| 2009/0128669 A1 | 5/2009 | Ng et al. |
| 2009/0140131 A1 | 6/2009 | Utagawa |
| 2009/0185051 A1 | 7/2009 | Sano |
| 2009/0185801 A1 | 7/2009 | Georgiev et al. |
| 2009/0204813 A1 | 8/2009 | Kwan |
| 2009/0268970 A1 | 10/2009 | Babacan |
| 2009/0273843 A1 | 11/2009 | Raskar et al. |
| 2009/0295829 A1 | 12/2009 | Georgiev et al. |
| 2010/0021001 A1 | 1/2010 | Honsinger et al. |
| 2010/0026852 A1 | 2/2010 | Ng et al. |
| 2010/0097444 A1 | 4/2010 | Lablans |
| 2010/0111489 A1 | 5/2010 | Presler |
| 2010/0128145 A1 | 5/2010 | Pitts et al. |
| 2010/0129048 A1 | 5/2010 | Pitts et al. |
| 2010/0141802 A1 | 6/2010 | Knight et al. |
| 2010/0277629 A1 | 11/2010 | Tanaka |
| 2010/0303288 A1 | 12/2010 | Malone |
| 2011/0018903 A1 | 1/2011 | Lapstun et al. |
| 2011/0050909 A1 | 3/2011 | Ellenby |
| 2011/0129120 A1 | 6/2011 | Chan |
| 2011/0129165 A1 | 6/2011 | Lim et al. |
| 2011/0133649 A1 | 6/2011 | Kreiner et al. |
| 2011/0311046 A1 | 12/2011 | Oka |
| 2012/0050562 A1 | 3/2012 | Perwass et al. |
| 2012/0249550 A1 | 10/2012 | Akeley |
| 2012/0327222 A1 | 12/2012 | Ng et al. |
| 2013/0088616 A1 | 4/2013 | Ingrassia, Jr. |
| 2013/0113981 A1 | 5/2013 | Knight et al. |
| 2013/0215226 A1 | 8/2013 | Chauvier et al. |

FOREIGN PATENT DOCUMENTS

| | | |
|---|---|---|
| WO | 06039486 | 4/2006 |
| WO | 07092545 | 8/2007 |
| WO | 07092581 | 8/2007 |
| WO | 2011029209 | 3/2011 |
| WO | 2011030234 | 3/2011 |

OTHER PUBLICATIONS

Nguyen, Hubert. "Practical Post-Process Depth of Field." GPU Gems 3. Upper Saddle River, NJ: Addison-Wesley, 2008.

Shade, Jonathan, et al., "Layered Depth Images", SIGGRAPH 98, pp. 1-2.

Tao, Michael, et al., "Depth from Combining Defocus and Correspondence Using Light-Field Cameras", Dec. 2013.

Adelson et al., "Single Lens Stereo with a Plenoptic Camera" IEEE Translation on Pattern Analysis and Machine Intelligence, Feb. 1992. vol. 14, No. 2, pp. 99-106.

Agarwala, A., et al., "Interactive Digital Photomontage," ACM Transactions on Graphics, Proceedings of SIGGRAPH 2004, vol. 32, No. 3, 2004.

Jin-Xang Chai et al., "Plenoptic Sampling", ACM SIGGRAPH 2000, Annual Conference Series, 2000, pp. 307-318.

Dowski et al., "Wavefront coding: a modem method of achieving high performance and/or low cost imaging systems" SPIE Proceedings, vol. 3779.

Georgiev, T., et al., "Spatio-Angular Resolution Tradeoff in Integral Photography," Proceedings of Eurographics Symposium on Rendering, 2006.

Gortler et al., "The lumigraph" SIGGRAPH 96, pp. 43-54.

Haeberli, "A Multifocus Method for Controlling Depth of Field" GRAPHICA Obscura, 1994, pp. 1-3.

Isaksen, A., et al., "Dynamically Reparameterized Light Fields," SIGGRAPH 2000, pp. 297-306.

(56) References Cited

OTHER PUBLICATIONS

Ives, H., "Optical properties of a Lippman lenticulated sheet," J. Opt. Soc. Am. 21, 171 (1931).
Jackson et al., "Selection of a Convolution Function for Fourier Inversion Using Gridding" IEEE Transactions on Medical Imaging, Sep. 1991, vol. 10, No. 3, pp. 473-478.
Levoy, M., et al., "Light Field Microscopy," ACM Transactions on Graphics, vol. 25, No. 3, Proceedings SIGGRAPH 2006.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Lippmann, "Reversible Prints", Communication at the French Society of Physics, Journal of Physics, 7 , 4, Mar. 1908, pp. 821-825.
Lumsdaine et al., "Full Resolution Lightfield Rendering" Adobe Technical Report Jan. 2008, pp. 1-12.
Naemura et al., "3-D Computer Graphics based on Integral Photography" Optics Express, Feb. 12, 2001. vol. 8, No. 2, pp. 255-262.
Ng, R., et al. "Light Field Photography with a Hand-held Plenoptic Camera," Stanford Technical Report, CSTR 2005-2, 2005.
Ng, R., "Digital Light Field Photography," Dissertation, Department of Computer Science, Stanford University, Jun. 2, 2006.
Ng., R., "Fourier Slice Photography,"ACM Transactions on Graphics, Proceedings of SIGGRAPH 2005, vol. 24, No. 3, 2005, pp. 735-744.
Okano et al., "Three-dimension video system based on integral photograophy" Optical Engineering, Jun. 1999. vol. 38, No. 6, pp. 1027-1077.
Sokolov, "Autostereoscopy and Integral Photography by Professor Lippmann's Method" , 1911, pp. 23-29.
Tanida et al., "Thin observation module by bound optics (TOMBO): concept and experimental verification" Applied Optics 40, Apr. 11, pp. 1806-1813.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
Vaish et al., "Using plane + parallax for calibrating dense camera arrays", In Proceedings CVPR 2004, pp. 2-9.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Adobe Systems Incorporated, "XMP Specification", Sep. 2005.
Fitzpatrick, Brad, "Camlistore", Feb. 1, 2011.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe, "Photoshop CS6 / in depth: Digital Negative (DNG)", http://www.adobe.com/products/photoshop/extend.displayTab2html. Retrieved Jan. 2013.
Georgiev, T., et al., Plenoptic Camera 2.0 (2008).
Georgiev, T., et al., "Unified Frequency Domain Analysis of Lightheld Cameras" (2008).
Girod, B., "Mobile Visual Search", IEEE Signal Processing Magazine, Jul. 2011.
Kopf, J., et al., Deep Photo: Model-Based Photograph Enhancement and Viewing, SIGGRAPH Asia 2008.
Mallat, Stephane, "A Wavelet Tour of Signal Processing", Academic Press 1998.
Nakamura, J., "Image Sensors and Signal Processing for Digital Still Cameras" (Optical Science and Engineering), 2005.
Nokia, "City Lens", May 2012.
Ogden, J., "Pyramid-Based Computer Graphics", 1985.
PrimeSense, "The Primesense 3D Awareness Sensor", 2007.
Shreiner, OpenGL Programming Guide, 7th edition, Chapter 8, 2010.
Story, D., "The Future of Photography", Optics Electronics, Oct. 2008.
Tagging photos on Flickr, Facebook and other online photo sharing sites (see, for example, http://support.gnip.com/customer/portal/articles/809309-flickr-geo-photos-tag-search). Retrieved Jan. 2013.
Portable Network Graphics format: http://en.wikipedia.org/wiki/Portable_Network_Graphics. Retrieved Jan. 2013.
Exchangeable image file format: http://en.wikipedia.org/wiki/Exchangeable_image_file_format. Retrieved Jan. 2013.
Extensible Metadata Platform: http://en.wikipedia.org/wiki/Extensible_Metadata_Platform. Retrieved Jan. 2013.
Compression standard JPEG XR: http://en.wikipedia.org/wiki/JPEG_XR. Retrieved Jan. 2013.
Methods of Variable Bitrate Encoding (http://en.wikipedia.org/wiki/Variable_bitrate#Methods_of_VBR_encoding). Retrieved Jan. 2013.
Lazy loading of image data (http://en.wikipedia.org/wiki/Lazy_loading). Retrieved Jan. 2013.
Key framing for video animation (http://en.wikipedia.org/wiki/Key_frame). Retrieved Jan. 2013.
Data overlay techniques for real-time visual feed. For example, heads-up displays (http://en.wikipedia.org/wiki/Head-up_display). Retrieved Jan. 2013.
Autofocus systems and methods (http://en.wikipedia.org/wiki/Autofocus). Retrieved Jan. 2013.
U.S. Appl. No. 15/824,574, filed Nov. 28, 2017, listing Chia-Kai Liang, et al. as inventors, entitled, "Depth-Based Image Blurring," 104 pages.
Yi-Ren Ng, Digital Light Field Photography, Doctoral Thesis, Stanford University, 2006 (203 pages).

DEPTH-ASSIGNED CONTENT FOR DEPTH-ENHANCED VIRTUAL REALITY IMAGES

CROSS-REFERENCE TO RELATED APPLICATIONS

The present application claims priority as a continuation-in-part of U.S. Utility application Ser. No. 13/533,319 for "Depth-Assigned Content for Depth-Enhanced Pictures," filed Jun. 26, 2012, the disclosure of which is incorporated herein by reference.

The present application is related to U.S. Utility application Ser. No. 11/948,901 for "Interactive Refocusing of Electronic Images," filed Nov. 30, 2007, the disclosure of which is incorporated herein by reference.

The present application is further related to U.S. Utility application Ser. No. 12/632,979 for "Light-field Data Acquisition Devices, and Methods of Using and Manufacturing Same," filed Dec. 8, 2009, the disclosure of which is incorporated herein by reference.

The present application is further related to U.S. Utility application Ser. No. 12/703,367 for "Light-field Camera Image, File and Configuration Data, and Method of Using, Storing and Communicating Same," filed Feb. 10, 2010, the disclosure of which is incorporated herein by reference.

The present application is further related to U.S. Utility application Ser. No. 13/155,882 for "Storage and Transmission of Pictures Including Multiple Frames," filed Jun. 8, 2011, the disclosure of which is incorporated herein by reference.

FIELD OF THE INVENTION

The present invention relates to interaction with, manipulation of, and viewing of depth-enhanced virtual reality images.

BACKGROUND

For purposes of the description provided herein, "depth-enhanced picture" refers to a representation of a scene that contains or references information associated with different depths, or distances from an image capture device. The depth-enhanced picture may contain representations of objects, each of which is associated with a perceived or actual distance from the image capture device. One example of a depth-enhanced picture is a light-field picture, which may contain information about the direction of light as it arrives at a sensor within a data acquisition device such as a light-field camera. Any number of rendered images can be generated from such a light-field picture; the rendered images can be associated with different depths. When a rendered image is generated from a picture, the rendered image has a focus depth; those objects in the picture that have a depth at or near that image's focus depth appear in focus, while other objects may appear out of focus.

Light-field data can be used to create representations of scenes that can be manipulated by a user. Subsequent to capture of picture data, light-field processing can be used to generate rendered images using the captured picture data. Various types of light-field processing can be performed, including for example refocusing, aberration correction, 3D viewing, parallax shifting, changing the viewpoint, and the like. These and other techniques are described in the related U.S. Utility Applications referenced above.

Conventionally, images may be represented as digital data that can be stored electronically. Many such image formats are known in the art, such as for example JPG, EXIF, BMP, PNG, PDF, TIFF and/or HD Photo data formats. Such image formats can be used for storing, manipulating, displaying, and/or transmitting image data.

Conventionally, two-dimensional images can be enhanced by adding comments, labels, titles, tags, annotations, captions, and the like. Such enhancements can be applied to particular locations within a two-dimensional image. In this manner, for example, a label can be generated which points to a particular location with a two-dimensional image; such a label can identify, for example, an object within the image.

In general, existing techniques for adding such tags do not take into account depth characteristics of pictures, and are thus limited in their utility when applied to depth-enhanced pictures such as may be made available by the use of light-field photography.

SUMMARY

According to various embodiments of the invention, a system and method are provided for enabling interaction with, manipulation of, and control of depth-assigned content in depth-enhanced pictures such as virtual reality images.

In at least one embodiment, the invention operates in connection with depth-enhanced pictures that can be refocused at different focus depths; one example of such a picture is a light-field picture. Any number of rendered images can be generated from a depth-enhanced picture, each such rendered image being associated with a particular focus depth. Objects represented in the depth-enhanced picture may be at different depths, wherein the depth of an object represents its distance from the image capture apparatus. Accordingly, for each rendered image that can be generated from a depth-enhanced picture, some subset of the represented objects may be in focus; specifically, those objects having a depth equal to or proximate to the focus depth of the rendered image will be in focus, and other objects will be out of focus.

In at least one embodiment, depth-assigned content can be provided in connection with a depth-enhanced picture. Each depth-assigned content item is associated with a particular depth, represented as a Z-coordinate, and may also be associated with a particular location, identified by X- and Y-coordinates in a Cartesian coordinate space. This allows the content item to be processed and/or displayed in connection with images rendered from the depth-enhanced picture, a manner that is sensitive to the particular focus depth of each rendered image. More particularly, the depth-enhanced content item can be configured so that it is presented in connection with a rendered image only when that image has a focus depth at or near the depth associated with the depth-enhanced content item. Additional mechanisms by which display of depth-enhanced content can be sensitive to or can react to focus depth of a rendered image are described herein. Also described herein are other mechanisms by which manipulations of the depth-enhanced content can affect other content, and vice versa.

Each depth-assigned content item can be data, metadata, and/or any other type of content, and may be associated with one or more sets of XYZ coordinates, where the X- and Y-coordinates define a two-dimensional position within a picture, and the Z-coordinate specifies a depth. Depth-assigned content can include labels, text, icons, images, videos, interactive links, and/or any other suitable content.

In at least one embodiment, such content becomes visible and/or available to the user when the picture is refocused to generate a rendered image at or near the depth specified by the Z-coordinate associated with the content. In at least one embodiment, such content becomes visible and/or available to the user when at least a portion of the picture containing the XY coordinate associated with the content is refocused to generate a rendered image at or near the depth specified by the Z-coordinate associated with the content.

Depth-assigned content can be associated with XYZ coordinates as described above, and/or it can be associated with objects, regions, and/or zones within the image. For example, in at least one embodiment, depth-assigned content associated with an object depicted in a picture is treated as though the depth-assigned content has a depth (Z-coordinate) substantially equal to or approximating the depth (Z-coordinate) of the object. To accomplish this, in at least one embodiment an image processing technique can be employed to ascertain the depth of an object within a scene, so that the content can be assigned to that depth. Such information may be collected at image capture time, and stored, or it can be automatically determined. Techniques for determining the depth of an object within a scene are well known in the art.

In at least one embodiment, when the picture (or the portion of the picture containing the XY coordinate) is refocused to generate a rendered image having a focus depth substantially different from the depth specified by the Z-coordinate associated with the content, the content may be omitted, grayed out, blurred, or otherwise displayed in a subdued manner. In this manner, content associated with an in-focus image element can be visually distinguished from content associated with an out-of-focus image element. For example, in at least one embodiment, depth-assigned content is visible only when an image element associated with the content is in focus (or nearly in focus, within a specified tolerance).

For example, if a picture contains representations of three objects, each having a different depth, depth-assigned content can be assigned to depths corresponding to each of the objects. Alternatively, the depth-assigned content can be arbitrarily associated with various XYZ coordinates, wherein (for example) each set of XY coordinates correspond to XY coordinates of one of the depicted objects, and the corresponding Z coordinate for the depth-assigned content corresponds to a Z-coordinate of the corresponding depicted object. In this manner, when a rendered image is generated from the picture, for display on a display screen, depth-assigned content describing an object can be configured to be depicted if the rendered image has a focus depth corresponding to the depth of that object, and the depth-assigned content can appear on the display screen at a location proximate to or overlapping the object (since the XY coordinate of the content corresponds to the XY coordinate of the object). When a rendered image with a different focus depth is generated, the depth-assigned content can disappear, or can be blurred, grayed out, or otherwise visually distinguished.

In at least one embodiment, the techniques described herein can be implemented in the context of a virtual reality or augmented reality system, with the XYZ coordinates described above being understood to be coordinates in the virtual world, and wherein depth-enhanced pictures include depth-enhanced virtual reality images. In such a system, focus depth may be measured, for example, from the position of the viewer, in a direction that corresponds to the orientation of the viewer's head. The focus depth may thus be understood to describe a plane in the virtual world, which focus plane is perpendicular to the viewer's orientation, and at a given distance (corresponding to the focus depth) from the viewer.

In a virtual reality or augmented reality system, the assigned depth for depth-assigned content may be understood to be at (or near) the focus depth if its XYZ coordinate is on (or near) the focus surface. In addition, in at least one embodiment, the focus surface can be oriented based on the position and direction of the viewer's gaze, by detecting the position(s) and orientation(s) of the viewer's head and/or eyes. Such eye-tracking may use existing technology, such as available from Tobii of Danderyd, Sweden. In addition, depth-assigned content can be made to appear or disappear based on position and direction of the viewer's gaze as well as depending on focus depth.

In various embodiments of the present invention, a user can interact with the depth-enhanced picture as well as with the depth-assigned content. This allows a user to manipulate the depth-enhanced picture, the depth-assigned content, and/or any combination thereof.

In various embodiments, the depth-assigned content can include any type of content, such as for example data, metadata, label(s), image(s), text, annotation(s), comment(s), audio content, interactive content, hyperlink(s), references to other documents or resources, and/or the like, and/or any combination thereof.

According to various embodiments of the invention, many different types of interactions are facilitated among depth-assigned content, depth-enhanced pictures, and other content. The system of the present invention thus provides a mechanism for enabling interaction with, manipulation of, and control of depth-assigned content in depth-enhanced pictures.

The present invention also provides additional advantages, as will be made apparent in the description provided herein.

Although the techniques described herein are applicable to depth-enhanced pictures captured on an image capture device having a microlens array using light-field photography, one skilled in the art will recognize that such techniques can be used in connection with any type of depth-enhanced pictures, including those that are generated using methods other than light-field photography. For example, and without limitation, the techniques described herein can be applied to any or all of: computer generated images, images that are originally two-dimensional but that have been manually or automatically enhanced with depth information, hand-drawn images; images that are captured stereoscopically and/or from multiple devices; images captured by grid-array cameras, and/or the like. In addition, the techniques described herein can be applied to any suitable combination of different types of imagery, such as for example computer generated images combined with live action images. Such combinations can be used, for example, in a virtual reality system, such as described above.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

Terminology

Figure 1A:
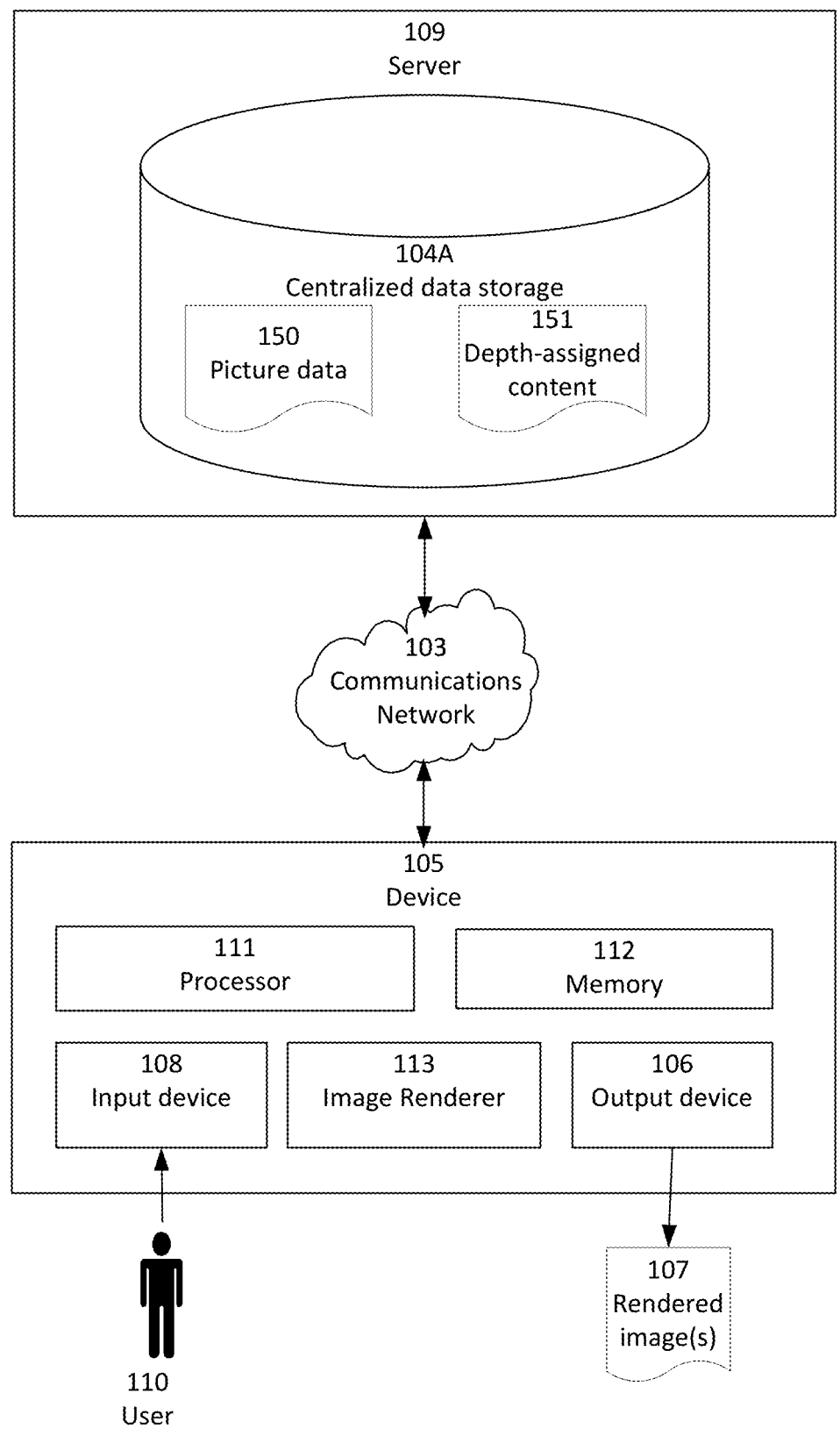
FIG. 1A depicts an architecture for implementing the present invention in a client/server environment, according to one embodiment.

The following terms are defined for purposes of the description provided herein:

Depth-enhanced picture (or "picture"): a representation of a scene, containing or referencing information describing or denoting the perceived or actual distance of one or more elements of the scene.

Depth-assigned content: content that is assigned to a particular depth. Depth-assigned content can be assigned to a depth expressed as a Z value, and/or assigned to a set of XYZ coordinates defining a position in three dimensions. Depth-assigned content can be associated with a depth-enhanced picture. Depth-assigned content can include any type of content, such as for example data, metadata, label(s), image(s), text, annotation(s), comment(s), audio content, interactive content, hyperlink(s), references to other documents or resources, and/or the like, and/or any combination thereof.

Light-field: a collection of rays. A ray's direction specifies a path taken by light, and its color specifies the radiance of light following that path.

Light-field picture: any representation of a four-dimensional light-field, such as for example a two-dimensional image containing directional information for light rays. The sensor data captured by a light-field camera is representative of a light-field picture.

Microlens: a small lens, typically one in an array of similar microlenses.

Pixel: an n-tuple of intensity values, with an implied meaning for each value. A typical 3-tuple pixel format is RGB, wherein the first value is red intensity, the second green intensity, and the third blue intensity. Also refers to an individual sensor element for capturing data for a pixel.

Sensor image: any representation of a raw image.

Two-dimensional (2D) image (or image): a two-dimensional (2D) array of pixels. The pixels are typically arranged in a square or rectangular Cartesian pattern, but other patterns are possible.

Device: any electronic device capable of capturing, processing, transmitting, receiving, and/or displaying pictures and/or image data.

Rendered image (or projected image): any image that has been generated from a depth-enhanced picture (such as a light-field picture), for example by rendering the depth-enhanced picture at a particular depth.

Depth map: a mapping of depth to points within a picture; specifies a depth value for each point (or for some set of points) in a picture.

User, end user, viewer, end viewer: These are terms that are used interchangeably to refer to the individual or entity to whom a rendered image is presented.

Content provider: Refers to a person, group, company, or entity that authors, provides, and/or configures content for presentation to end users. The content provider may also specify that the content be displayed to the user in a certain way, as described herein. Such configuration can also be done by a system administrator and/or other entity instead of or in addition to the content provider.

Virtual reality: A computer-generated simulation of a three-dimensional image or environment with which a user can interact in a seemingly real or physical way using immersive electronic equipment for input and/or output, such as a helmet containing a screen, and/or gloves fitted with sensors.

Augmented reality: A technology that superimposes a computer-generated image onto a user's view of the real world, thus providing a composite view with which the user can interact. An augmented reality scene can be presented using immersive electronic equipment similar to that described above in connection with virtual reality.

In addition, for ease of nomenclature, the term "camera" may be used herein to refer to an image capture device, light-field image capture device, or other data acquisition device. Such a data acquisition device can be any device or system for acquiring, recording, measuring, estimating, determining and/or computing data representative of a scene, including but not limited to two-dimensional image data, three-dimensional image data, picture data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present invention, and that the invention is not limited to cameras. Thus, the use of the term "camera" herein is intended to be illustrative and exemplary, but should not be considered to limit the scope of the invention. Specifically, any use of such term herein should be considered to refer to any suitable data acquisition device.

System Architecture

Referring now to FIG. 1A, there is shown an architecture for implementing the present invention in a client/server environment according to one embodiment. Device 105 can be any electronic device capable of capturing, processing, transmitting, receiving, rendering, and/or displaying pictures and/or image data. For example, device 105 may be any electronic device having output device 106 (such as a screen) on which user 110 can view an image. Device 105 may be, for example and without limitation, a desktop computer, laptop computer, personal digital assistant (PDA), cellular telephone, smartphone, music player, handheld computer, tablet computer, kiosk, game system, enterprise computing system, server computer, or the like. In at least one embodiment, device 105 runs an operating system such as for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on such devices.

In at least one embodiment, user 110 interacts with device 105 via input device 108, which may include physical button(s), touchscreen, rocker switch, dial, knob, graphical user interface, mouse, trackpad, trackball, touch-sensitive screen, touch-sensitive surface, keyboard, and/or any combination thereof. Device 105 may operate under the control of software.

In at least one embodiment, device 105 is communicatively coupled with server 109, which may be remotely located with respect to device 105, via communications network 103. Picture data 150 and/or depth-assigned content 151 are stored in storage device 104A associated with server 109. Data storage 104A may be implemented as any magnetic, optical, and/or electrical storage device for storage of data in digital form, such as flash memory, magnetic hard drive, CD-ROM, DVD-ROM, and/or the like.

In at least one embodiment, device 105 includes a number of hardware components as are well known to those skilled in the art. For example, device 105 may include, one or more processors 111 (which can be conventional microprocessor(s) for performing operations on data under the direction of software, according to well-known techniques) and memory 112 (such as random-access memory having a structure and architecture as are known in the art, for use by the one or more processors in the course of running software). Such components are well known computing architectures.

Device 105 makes requests of server 109 in order to retrieve picture data 150 and/or depth-assigned content 151 from storage 104A via communications network 103 according to known network communication techniques and protocols. Communications network 103 can be any suitable network, such as the Internet. In such an embodiment, picture data 150 and/or depth-assigned content 151 can be transmitted to device 105 using HTTP and/or any other suitable data transfer protocol. Once picture data 150 and/or depth-assigned content 151 are available at device 105, image renderer 113 renders picture data 150, including selected depth-assigned content 151, to generate rendered image(s) 107 for display at output device 106. Rendered image(s) 107 displayed at output device 106 include(s), in at least one embodiment, some subset of available depth-assigned content 151, depending on, for example, the current focus depth at which picture data 150 is being displayed. As described in more detail herein, user 110 can interact with input device 108 to change the focus depth at which picture data 150 is being displayed, thereby causing different subsets of depth-assigned content 151 to be included in rendered image(s) 107.

Device 105 may obtain depth-enhanced pictures and/or depth-assigned content from server 109 in advance, or in response to a request from user 110 for display of images. In at least one embodiment, pictures and/or depth-assigned content are requested and received from server 109 on an as-needed basis; for example, device 105 may only request particular portions of pictures and/or content needed for a particular rendering, and can request additional data and/or content as needed for subsequent renderings. Alternatively, device 105 may receive such pictures and/or content in advance, allowing subsequent rendering to take place without the need for requesting or receiving additional pictures and/or content. In addition, a cache can be provided, at server 109, and/or at device 105, and/or at some other location, for temporary storage of depth-enhanced pictures and/or depth-assigned content.

One skilled in the art will recognize that the architecture depicted in FIG. 1A is merely exemplary, and that the techniques of the present invention can be implemented using other architectures, components, and arrangements. For example, in an alternative embodiment, the techniques of the present invention can be implemented in a stand-alone electronic device, wherein picture data 150 and/or depth-assigned content 151 are stored locally.

Figure 1B:
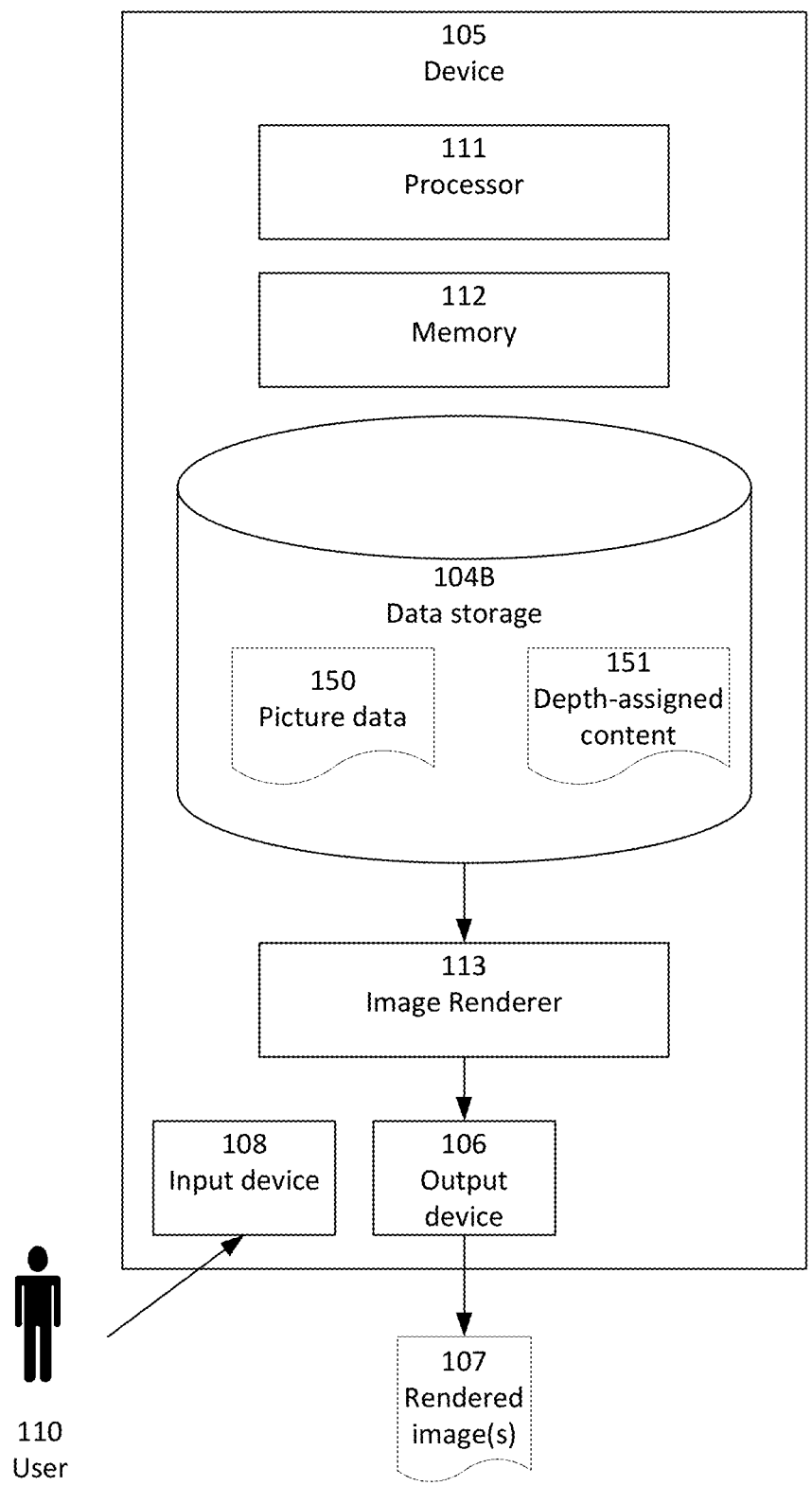
FIG. 1B depicts an architecture for implementing the present invention in a stand-alone device, according to one embodiment.

For example, referring now to FIG. 1B, there is shown an architecture for implementing the present invention in a stand-alone device, according to one embodiment. Here, picture data 150 and/or depth-assigned content 151 are stored locally in data storage 104B associated with device 105, rather than in server-based storage as depicted in FIG. 1A. Other components depicted in FIG. 1B operate in substantially the same manner as described above in connection with FIG. 1A. In other embodiments, some subset of picture data 150 and/or depth-assigned content 151 may be stored locally at device 105, while another subset may be stored at centralized data storage 104A associated with server 109. One skilled in the art will recognize that the techniques of the present invention can be applied in many different architectures, wherein data can be stored in any centralized and/or distributed manner, and wherein the architecture is implemented using a single device or any suitable network of devices.

In various embodiments, picture data 150 is associated with light-field pictures. As described in more detail in the above-referenced applications, such data can be organized in terms of pictures and frames, with each picture having any number of frames. As described in the above-referenced applications, frames may represent individual capture events that took place at one or several image capture devices, and that are combinable to generate a picture. Such a relationship and data structure are merely exemplary, however; the techniques of the present invention can be implemented in connection with picture data having other formats and arrangements. In other embodiments, picture data 150 can be derived from light-field pictures, or may represent conventional non-light-field image data.

Depth-Assigned Content

According to various embodiments, the display of digital image content to a user is augmented by allowing for presentation and dynamic manipulation of content that has been associated with depth-related information inherent to a depth-enhanced picture.

For purposes of the description provided herein, "depth-enhanced picture" refers to any picture that contains or references information describing or denoting the perceived or actual distance of one or more elements of the picture. Such distances may reflect, for example, the distance from the subject of an picture and the image capture device. One example of a depth-enhanced picture is a light-field picture, which may contain information about the direction of light as it arrives at a sensor within a data acquisition device such as a light-field camera. Depth-enhanced pictures can also include any type of picture containing depth information, including pictures captured by means of microlens arrays or grid arrays, or through any other suitable means.

Content, such as tags, labels, annotations, and the like, can be assigned to or associated with particular XY coordinates of a picture. According to at least one embodiment of the present invention, such content can further be assigned to a specific depth, or Z-coordinate, or to a range of depths, or Z-coordinates. Assignment of content to a depth (or range of depths) can be in addition to assignment to an XY coordinate or range of coordinates; thus, such depth-assigned content can be associated with a particular XYZ coordinate in the three-dimensional space represented in the picture. Alternatively, depth-assigned content can be associated with a depth or range of depths but not to a particular XY coordinate position, so that such content would be associated with the entire picture, but only when such picture is being rendered to generate a rendered image at or near the specified depth (s).

In this manner, content can be localized to a particular depth and/or to a particular region of an image.

The presentation of depth-assigned content can be made dynamic, since it can depend on the currently displayed focus depth (based on user input or based on automatic selection of a displayed focus depth). For example, in at least one embodiment, a user can dynamically refocus a picture to any of a number of different focus depths. As the picture is refocused to different depths, different depth-assigned content can be displayed in a dynamic manner and in response to the user's input. Such techniques provide an augmented experience of content localization for pictures by incorporating a depth component that responds to refocusing operations.

In addition, in at least one embodiment, the user can interact with and/or modify the depth-assigned content itself, and such interactions can in turn cause changes to the associated picture. In such a manner, the system and method of the present invention allow content manipulations to be expressed as alterations of the appearance of the depth-enhanced picture itself, and/or the appearance of non-intrinsic content assigned to or added to light-field pictures. In addition, content manipulation can cause alteration of other digital content such as static images, text, video, metadata, and/or any other content associated with the depth-enhanced picture.

Figure 5:
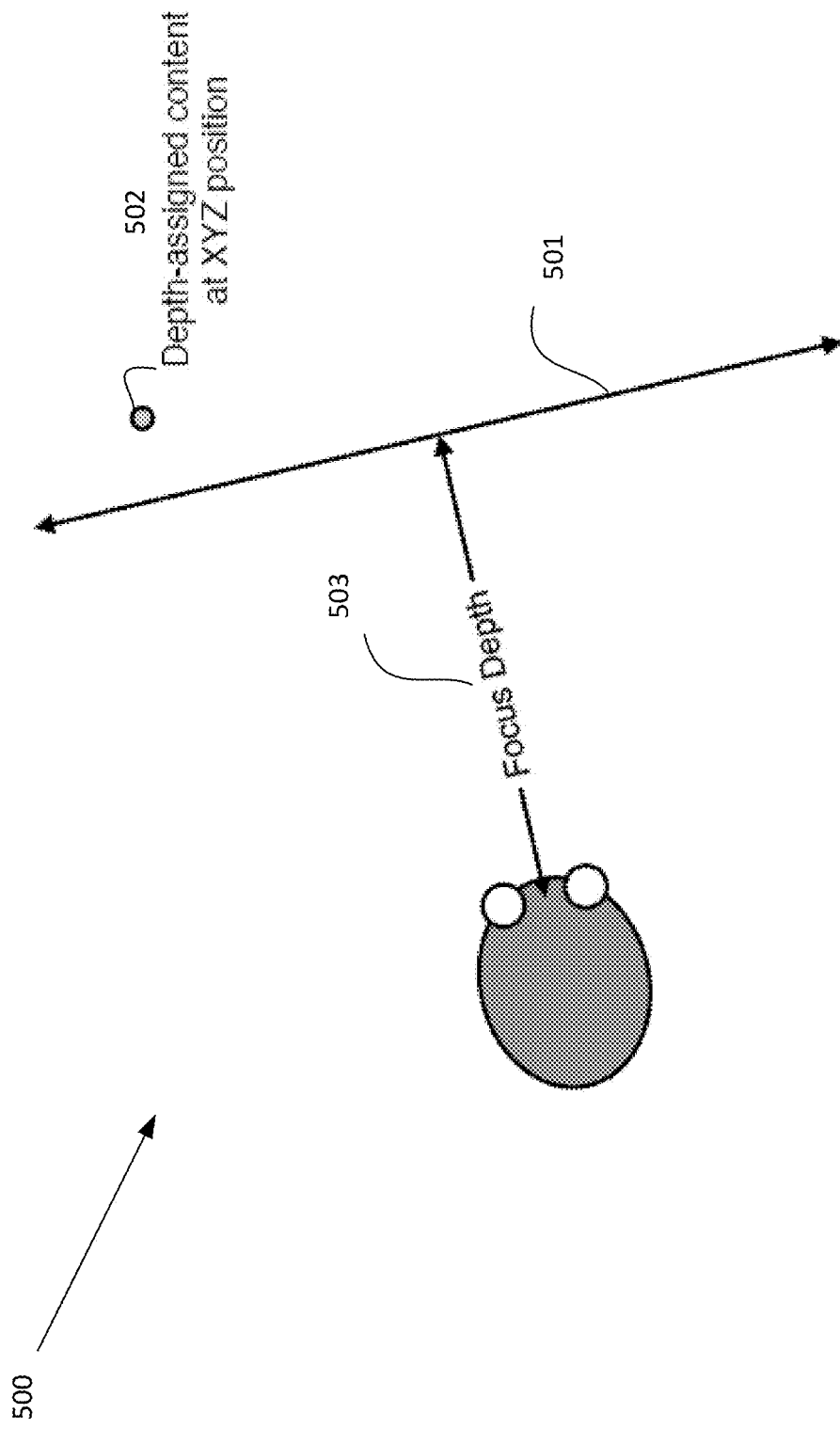
FIG. 5 depicts an example of associating depth-assigned content with XYZ coordinates in a virtual reality or augmented reality scene, according to one embodiment.

As mentioned above, in at least one embodiment, the techniques described herein can be implemented in the context of a virtual reality or augmented reality system, with the XYZ coordinates described above being understood to be coordinates in the virtual world. In such a system, focus depth may be measured, for example, from the position of the viewer, in a direction that corresponds to the orientation of the viewer's head. Referring now to FIG. 5, there is shown an example of a virtual reality scene 500 wherein viewer 110 is viewing content in a virtual world. Focus plane 501 is situated in the virtual world at an orientation that is perpendicular to viewer's 110 orientation, and at a given distance (corresponding to focus depth 503) from viewer 110. Other definitions are also possible, such as may describe focus surfaces that are curved rather than planar. For example, the focus surface might be a sphere centered on the viewer, with radius equal to the focus depth.

In a virtual reality or augmented reality system, as depicted in the example of FIG. 5, the assigned depth for depth-assigned content 502 may be understood to be at (or near) focus depth 503 if its XYZ coordinate is on (or near) the focus surface defined by focus plane 501. In at least one embodiment, the assigned depth is considered to be "near" the focus surface defined by focus plane 501 if such depth is within the depth of field of viewer 110. In addition, in at least one embodiment, the focus surface defined by focus plan 501 can be oriented based on the position and direction of viewer's 110 gaze, by detecting the position(s) and orientation(s) of viewer's 110 head and/or eyes. Such eye-tracking may use existing technology, such as available from Tobii of Danderyd, Sweden. In addition, depth-assigned content can be made to appear or disappear based on position and direction of the viewer's gaze as well as depending on focus depth.

Assignment of Content to Specific Depth Coordinates

According to at least one embodiment of the present invention, content that is not intrinsic to a depth-enhanced picture (such as a light-field picture, computer-generated image, or virtual or augmented reality image) may be assigned to specific focus-depth value(s) within the picture. Such content can include, for example and without limitation, comments, labels, titles, tags, annotations, captions, data, metadata, images, text, links, interactive elements, video, user interface elements, and the like. Assignment of content to depth values in this manner allows the presentation of the content to be controlled in response to depth-related manipulations of the depth-enhanced picture. Conversely, such an arrangement allows the depth-enhanced picture itself to be altered based on user manipulations of the depth-assigned content.

Such associations between depth-assigned content and the picture can be implemented in a spatially localized fashion. For example, depth-assigned content can be associated with particular XY coordinates of the picture, and/or with particular objects depicted in the picture that themselves have XY coordinate positions. Depth-assigned content can also be associated with non-spatial dimensions, such as time.

Depth-enhanced pictures, such as dynamically rendered light-field pictures, intrinsically contain depth information in addition to two-dimensional data expressed in XY coordinates. This depth-related information, or information related to a Z-coordinate, can be used to provide additional specificity in the assignment of data to spatially localized regions of a picture.

In at least one embodiment, content may be assigned to one or more specific sets of XYZ coordinates within the depth-enhanced picture and/or to Z values without reference to XY coordinate values. Assignment of content to depth values in this manner augments picture tagging operations, and provides improved mechanisms for enhancing depth-enhanced pictures with additional data, metadata, and/or other content that is not intrinsic to the original depth-enhanced picture.

Assigning content to various depth(s) of an image is a useful technique for gathering, organizing, and presenting information about the picture and/or its contents. In various embodiments, the assignment of content to depth(s) can be performed automatically, or it can be performed manually by the content creator, content managers or publishers, and/or from one or more viewers of the picture and its contents. Such assignment of content to depth(s) may also be done in order to allow the picture and its associated content to be manipulated by extrinsic users or systems. Additional information that is related to, but extrinsic from, the original depth-enhanced picture may then be used to enable the implementation of a plurality of operations.

In at least one embodiment, depth-assigned content may include any suitable information assigned to one or more specific XYZ coordinates within a depth-enhanced picture, thereby augmenting the experience of tagging the picture and/or its contents. Assignment of depth-assigned content may be performed in order to gather and organize information about the picture that is generated by the content creator, content managers or publishers, and/or from one or more viewers of the picture and its content. In at least one embodiment, depth-assigned content is stored as data or metadata associated with the depth-enhanced picture. Depth-assigned content can be stored in the same file as the picture data, or in a different file that is associated with the picture data. Any suitable data structure can be used.

For example, in at least one embodiment, a user (such as a viewer of a rendered image or any other individual) can assign a name, keyword, point of interest, or other information to an element or location within a picture, based on the XYZ coordinates of that element or location. In at least one embodiment, assignment of such information can be performed automatically, such as through the utilization of object-recognition software or other intelligent processes.

In at least one embodiment, a user can assign a string of text to one or more specific XYZ coordinates within the depth-enhanced picture. This string of text may be used to display captions, keyword labels for the content of the picture, comments from viewers, and/or the like.

In at least one embodiment, a user can assign a relationship between web-based content or other content and one or more specific XYZ coordinates within the depth-enhanced picture. Furthermore, in at least one embodiment, such a relationship may facilitate dynamic updating of the web-based content or other content based on manipulation of the depth-enhanced picture; conversely, such a relationship may facilitate dynamic updating of the depth-enhanced picture based on changes to the web-based content or other content.

Method

Figure 2A:
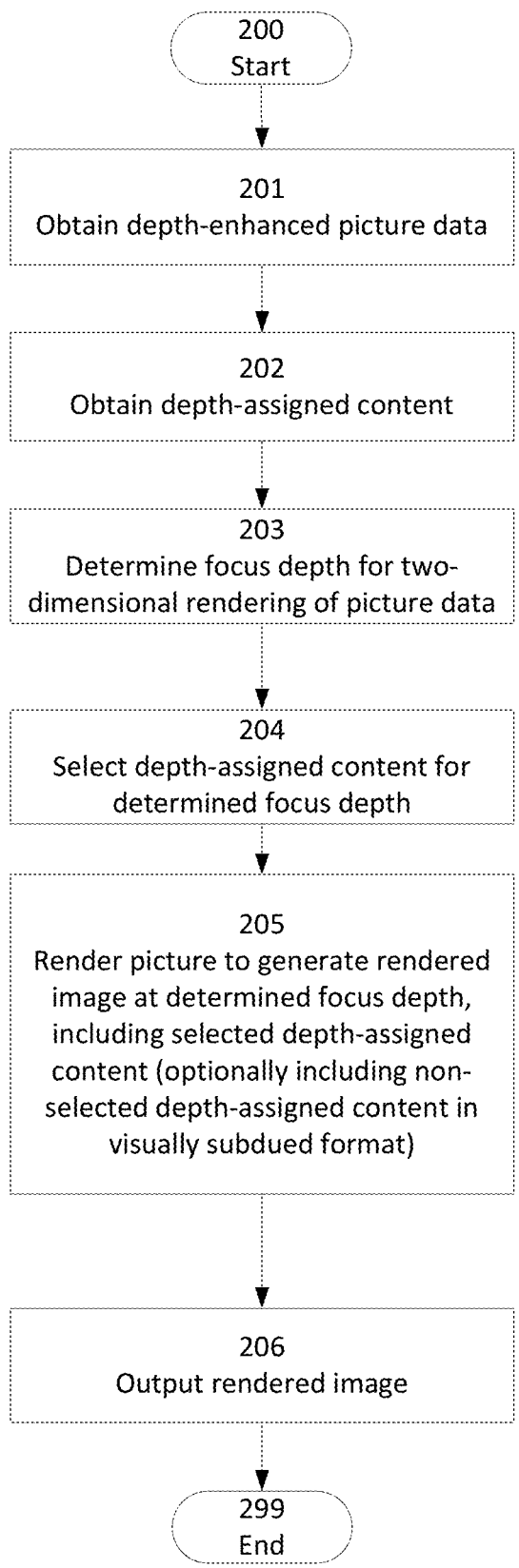
FIG. 2A is a flowchart depicting a method for displaying depth-assigned content associated with a depth-enhanced picture, according to one embodiment.

Referring now to FIG. 2A, there is shown a flowchart depicting a method for displaying depth-assigned content associated with a depth-enhanced picture, according to one embodiment. The method steps depicted in FIG. 2A can be performed by a system constructed according to the architecture depicted in FIG. 1A or FIG. 1B, or by any system constructed according to any other suitable architecture. The depiction of particular steps in a particular sequence is provided for illustrative purposes only, and is not intended to limit the scope of the claimed invention to those particular steps or in that particular sequence.

Depth-enhanced picture data is obtained 201 from any suitable source such as, for example, centralized data storage 104A as shown in FIG. 1A or local data storage 104B as shown in FIG. 1B. Depth-enhanced picture data can be obtained 201, for example, as a light-field picture file based on image data captured by a light-field camera, or it can be computer generated imagery, or virtual or augmented reality imagery. Depth-assigned content associated with the depth-enhanced picture data is obtained 202. In at least one embodiment, such depth-assigned content is obtained as part of the same file as depth-enhanced picture data; otherwise it can be obtained and/or generated separately.

A focus depth is determined 203 (or selected) for two-dimensional rendering of the obtained picture data. For example, if the picture data is a light-field picture, step 203 can involve selecting a focus depth for projection of the light-field picture to generate an image for presentation on a display screen. Such projection can be performed, for example, in accordance with techniques described in the above-cited related U.S. patent applications.

In at least one embodiment, determination 203 of the focus depth is performed in response to user input, for example based on user manipulation of a slider control for selecting a focus depth. In at least one embodiment, determination 203 of the focus depth is performed based on user selection of a position within the image; a focus depth is then selected based on the focus depth of an object represented in the image at the selected position. Such techniques are described, for example, in related U.S. Utility application Ser. No. 11/948,901 for "Interactive Refocusing of Electronic Images," filed Nov. 30, 2007, the disclosure of which is incorporated herein by reference.

Alternatively, any suitable technique can be used for determining 203 (or selecting) a focus depth, including automated and/or manual selection of the focus depth.

Depth-assigned content for the selected focus depth is selected 204. In at least one embodiment, such selection is performed by selecting the depth-assigned content that is indexed to the Z-coordinate value corresponding to the selected focus depth. A suitable tolerance can be established, so that depth-assigned content that is indexed to a Z-coordinate value that is sufficiently close to that of the selected focus depth (i.e., that lies within the specified tolerance) is displayed.

Image renderer 113 then renders 205 the picture to generate a rendered image at the selected focus depth, for display at output device 106. In at least one embodiment, the rendered image includes the depth-assigned content selected in step 204. Depth-assigned content that is not indexed to the Z-coordinate value corresponding to the depth at which the image is being rendered may be omitted, or may be displayed in a subdued format (e.g. by being blurred, grayed out, or otherwise visually distinguished). In at least one embodiment, wherein the tolerance is specified, depth-assigned content that is indexed to a Z-coordinate value outside the tolerance value with respect to the depth at which the image is being rendered may be omitted or displayed in a subdued format.

In at least one embodiment, the greater the distance between the Z-coordinate value of the depth-assigned content and the depth at which the picture is being rendered, the more pronounced is the subduing effect. Thus, the depth-assigned content may be more or less grayed out, or more or less blurred, based on the difference between the Z-coordinate value of the depth-assigned content and the depth at which the picture is being rendered.

The rendered image, possibly including the depth-assigned content, is output 206 at output device 106. The method ends 299.

Figure 2B:
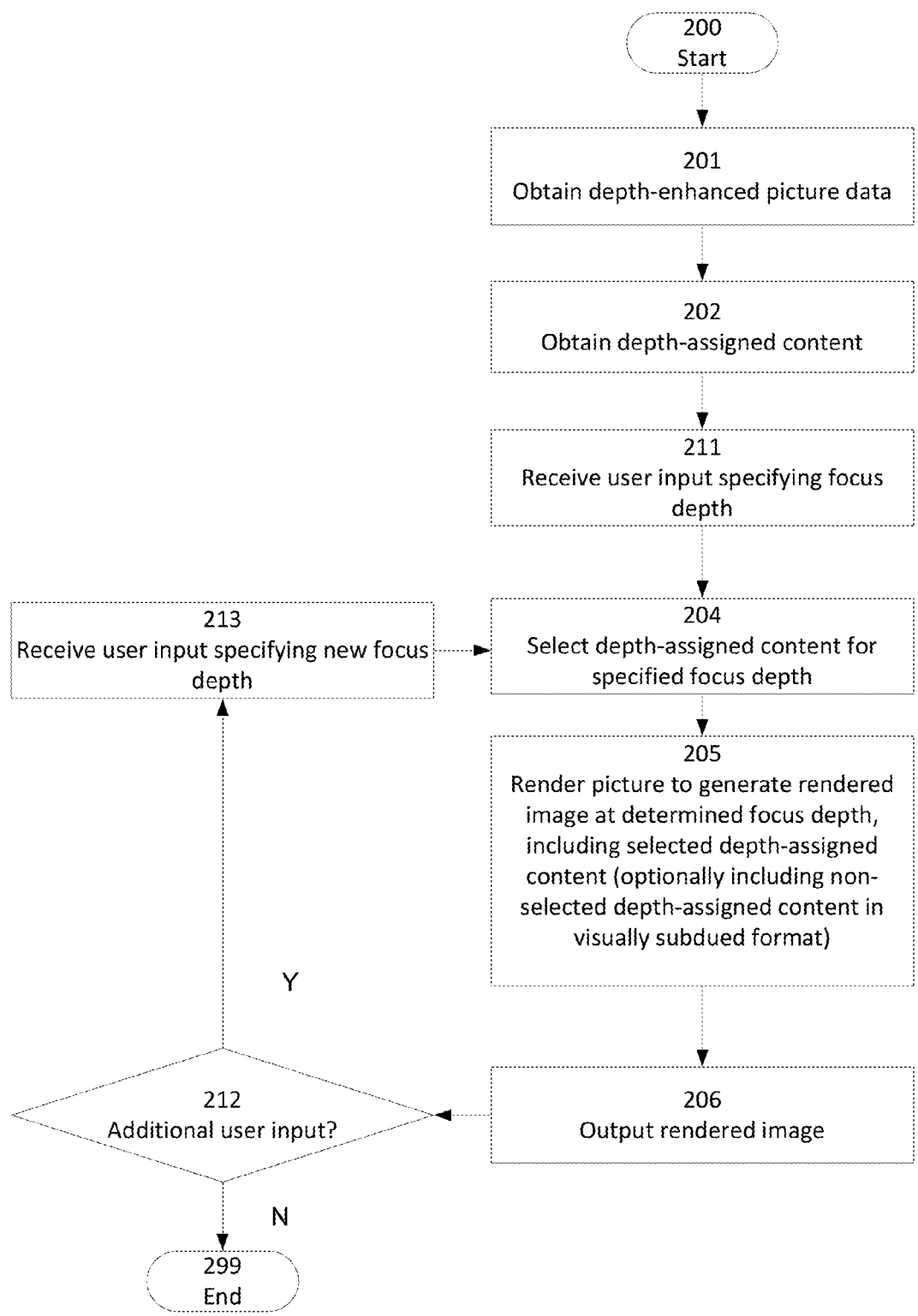
FIG. 2B is a flowchart depicting a method for interactive display of depth-assigned content associated with a depth-enhanced picture, according to one embodiment.

In at least one embodiment, the system and method of the present invention can be implemented in connection with interactive display of depth-assigned content. Referring now to FIG. 2B, there is shown a flowchart depicting a method for interactive display of depth-assigned content associated with a depth-enhanced picture, according to one embodiment. The method steps depicted in FIG. 2B can be performed by a system constructed according to the architecture depicted in FIG. 1A or FIG. 1B, or by any system constructed according to any other suitable architecture. The depiction of particular steps in a particular sequence is provided for illustrative purposes only, and is not intended to limit the scope of the claimed invention to those particular steps or in that particular sequence.

Steps 201 and 202 are performed as described above in connection with FIG. 2A. User input is received 211, for example at input device 108, specifying a focus depth. As described above, the user input can include, for example user manipulation of a slider control for selecting a focus depth, or selection of a position within the image, or any other suitable technique(s), some of which may be described the above-referenced related patent application(s).

Steps 204 to 206 are performed as described above in connection with FIG. 2A. After the rendered image has been output, if there is any additional user input 212 to specify a new focus depth, such user input is received 213, and steps 204 to 206 are repeated based on the newly received input. Once no more user input is provided 212, the method ends 299.

In at least one embodiment, depth-assigned content for a number of different depths can be obtained by device 105 in advance. Such content can be stored locally at device 105, so that it is readily available and can be included in rendered images quickly in response to changes to the focus depth. Local storage of such content can avoid the need to wait for content to be requested and received with each change to focus depth. Alternatively, depth-assigned content can be generated or obtained on an as-needed basis, in response to changes to focus depth. In at least one embodiment, predictive techniques can be used to anticipate the need for particular depth-assigned content, thereby improving response time. In addition, depth-assigned content can be cached locally and/or at nearby servers to improve response time.

Variations

One skilled in the art will recognize that many different variations and embodiments can be implemented in connection with the display, control, and manipulation of depth-assigned content in accordance with the techniques of the present invention. The following are an exemplary set of embodiments presented for illustrative purposes, and are not intended to limit the scope of the invention as set forth in the claims.

Display of Depth-Assigned, Extrinsic Content within a Light-Field Picture in Response to Interactions with Intrinsic Depth Information In at least one embodiment, content that has been assigned to specific depths of a light-field picture, but that is not intrinsic to the captured 3D image, may be displayed within the image in a fashion that is contingent upon the depth-related display of the foundational light-field picture. For example, depth-assigned content such as text, watermarks, images, digitally inserted objects, and the like, can be selectively displayed or hidden in response to currently displayed focus depth, parallax view, applied relighting effects, and the like. In addition, in at least one embodiment, the manner in which the depth-assigned content is displayed may depend on any such factors; for example, depth-assigned content can be selectively blurred or sharpened based on currently viewed focal plane, and/or can be shifted in position based on current viewing angle (parallax), and/or can be highlighted/shadowed based on currently applied relighting effects.

Reveal Depth-Assigned Content Based on Active Depth Plane.

In at least one embodiment, content assigned to a particular set of XYZ coordinates may be rendered within a rendered image only when the Z-value of the depth-assigned content matches, within a specified tolerance, the active or primary focus plane at which the picture was rendered to generate the rendered image. For example, a mark or symbol denoting the location where a tag has been placed, say at XYZ coordinates (a, b, c), may appear only when the picture is rendered to generate a rendered image having a focus depth of (c+/−n), where (n) represents a tolerance band of z-depths in which the image viewer may still consider the image to be rendered as reasonably "in-focus" around the specified depth (c).

Render Content Using Appearance Consistent with Image.

In at least one embodiment, the appearance of the supplementary content rendered within the depth-enhanced picture changes as the user manipulates the rendering of the base image. In at least one embodiment, such content may be rendered within the rendered image itself, so that the appearance of the extrinsic content is visually consistent with the depth-enhanced rendering of the Z-coordinates of the image to which it has been assigned. For example, a symbol designating the location of user-added tags may be rendered so that they focus and de-focus in tandem with the depth plane to which the tags have been assigned. This provides users with strong visual cues to the location of the depth assigned content within the depth-enhanced picture, and also serves to enhance the visual effect of the rendering so it is coherent across all content within the rendered depth-enhanced picture.

Change Appearance of Content in Response to Depth.

In at least one embodiment, the extrinsic content assigned to a set of XYZ coordinates may change its color, shape, opacity, and/or any other visual characteristics in response to the depth at which the picture is being rendered. For example a photographer may assign a watermark for copyright purposes to a depth-enhanced picture, but may set the watermark to be visible only at the depth or depths to which the photographer has assigned the mark. This allows the user to protect his or her most sensitive content while keeping the remainder of the depth-enhanced picture comparatively uncluttered and pristine. In another embodiment, a content provider may choose to censor the information by means that are active only when the portion of the picture subject to restriction is rendered as in-focus.

Parallax Controls Reveal of Depth-Assigned Content.

In at least one embodiment, parallax motion can be used to hide and/or show depth-assigned content (such as extrinsic imagery rendered within the depth-enhanced picture), so as to treat such objects as though they are physical objects within a three-dimensional spatial environment. In this embodiment, rendering effects that are applied to the depth-enhanced picture are also applied to the extrinsic content as if it were integral to the original picture. Any changes in rendering to the base picture are applied in kind to the content added to said picture, so that the appearance of the extrinsic content is visually consistent both with the depth-enhanced rendering of the picture to which it has been assigned as well as with any other depth-assigned content within the picture.

For example a user may manipulate a picture to change the rendered angle of view within the picture. Such an effect is referred to as "parallax shift", in which objects rendered in the foreground may shift so they occlude objects rendered in the background. According to at least one embodiment of the present invention, a visual effect may also be applied to extrinsic objects (depth-assigned content) that are digitally rendered at a specified depth within the original picture, such that they also respond to parallax shifts and other depth-related effects in a fashion consistent with objects located at the same depths within an original depth-enhanced picture. In this manner, for example, depth-assigned content may be made visible only when its associated XYZ coordinate is not occluded by a nearer object. This conditional visibility can, in at least one embodiment, operate independently of, or in conjunction with, focus depth. That is, the depth-assigned content could be visible only if unoccluded and in focus, or if unoccluded, or if in focus.

EXAMPLE

Referring now to FIGS. 3A through 3D, there is shown an example of associating depth-assigned content with XYZ coordinates of a depth-enhanced picture 300, according to one embodiment. For illustrative purposes, depth-enhanced picture 300 is shown as having three elements 301A, 301B, 301C each being positioned at a different perceived distance from the image viewer. Thus, each of the three elements 301A, 301B, 301C would have a different Z value indicating its perceived distance, or depth. For illustrative purposes only, each of the elements 301A, 301B, 301C is assumed to be flat. In fact, in practice, various portions of each element 301A, 301B, 301C can have different Z values signifying different depth(s). Thus, one skilled in the art will recognize that the depiction of three distinct layers containing elements 301A, 301B, 301C is a simplification for illustrative purposes only.

Figure 3A:
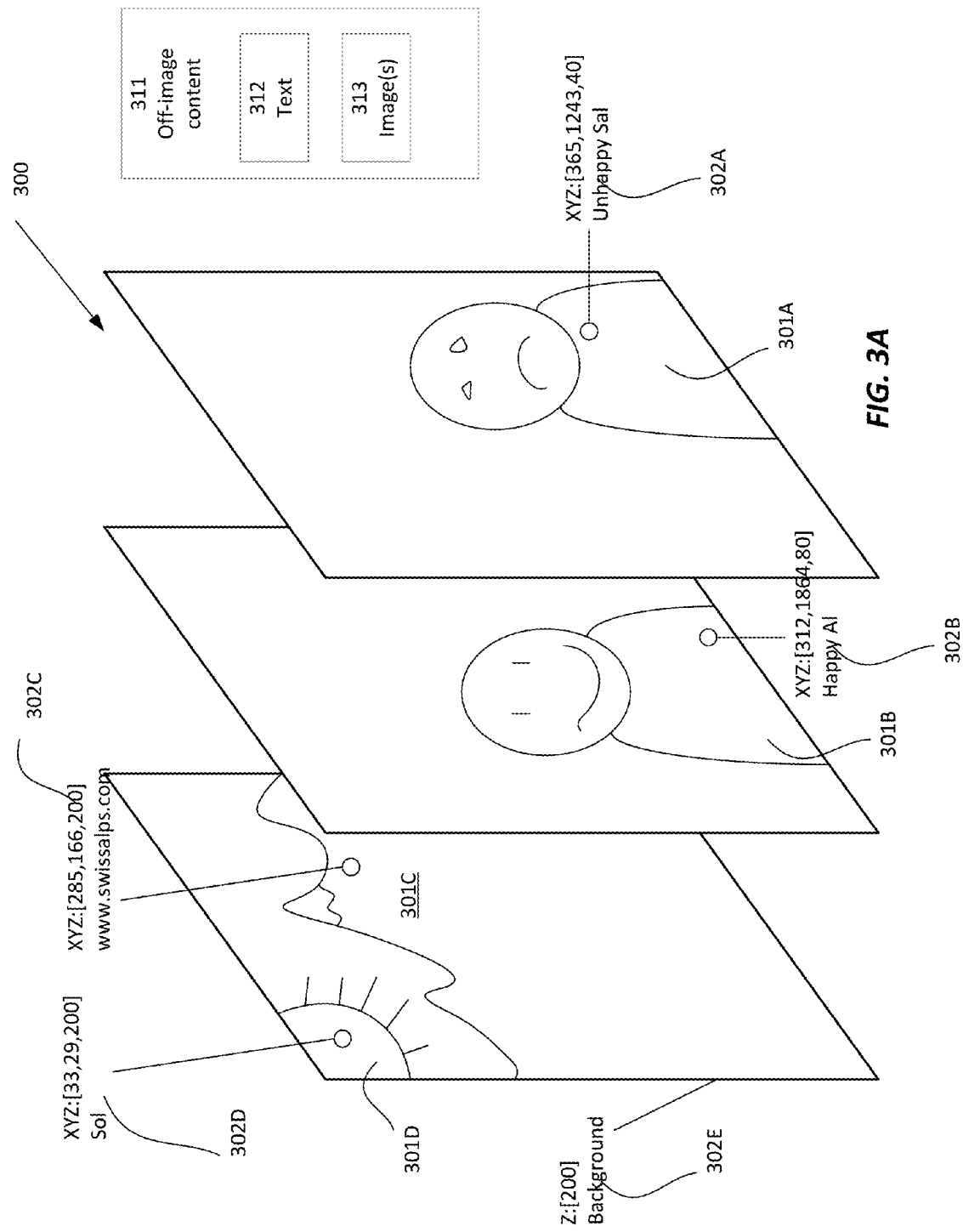
FIGS. 3A through 3D depict an example of associating depth-assigned content with XYZ-coordinates of a depth-enhanced picture, according to one embodiment.

FIG. 3A depicts a conceptual oblique view of depth-enhanced picture 300, wherein different elements are shown in different layers for illustrative purposes. Foreground element 301A is a representation of "Unhappy Sal". Midground element 301B, which is designated as being farther away from the image viewer, is a representation of "Happy Al". Background element 301C, which is designated as being even farther away from the image viewer, is a representation of a mountainous background scene.

In accordance with the techniques of the present invention, depth-assigned content has been added to depth-enhanced picture 300, in the form of tags 302A-E. Tag 302A is associated with a specific set of XYZ coordinates [365, 123, 40], wherein the Z value [40] corresponds to the depth of foreground element 301A, and the XY coordinates [365, 123] correspond to a specific location on Unhappy Sal. Tag 302A contains text string "Unhappy Sal", identifying the portrayed individual. Tag 302B is associated with another set of XYZ coordinates [312, 1864, 80], wherein the Z value [80] corresponds to the depth of midground element 301B, and the XY coordinates [312,1864] correspond to a specific location on Happy Al. Tag 302B contains text string "Happy Al", identifying the portrayed individual. Tag 302C is associated with another set of XYZ coordinates [285, 166, 200], wherein the Z value [200] corresponds to the depth of background element 301C, and the XY coordinates [285, 166] correspond to a specific location on the depiction of the Swiss Alps. Tag 302C contains a hyperlink reference to "www.swissalps.com". Tag 302D is associated with another set of XYZ coordinates [33, 29, 200], wherein the Z value [200] corresponds to the depth of background element 301D, and the XY coordinates [33,29] correspond to a specific location on the depiction of the sun. Tag 302D contains text string "Sol".

In at least one embodiment, depth-assigned content can be associated with a Z value without reference to an XY coordinate. For example, in FIG. 3A, tag 302E is associated with Z value of 200, without reference to any specific XY coordinates. Thus, tag 302E is associated with the background layer as a whole, rather than with any particular element within that layer. Tag 302E contains text string "Background".

In at least one embodiment, a viewer of a rendered image generated from picture 300 would see tags 302A-E only when the corresponding image elements were in focus (or close to being in focus). If picture 300 is refocused in such a way that some elements 301A-C are out of focus, those corresponding tags 302A-E can disappear, or they can be presented in a subdued manner such as blurred, grayed out, or otherwise visually distinguished. As the user refocuses picture 300 to bring elements 301A-C into focus, corresponding tags 302A-E can be brought into view, and/or brought into sharp focus, or otherwise emphasized or made clearer. In at least one embodiment, transitions are smooth and/or animations are presented when tags 302A-E are introduced or dismissed, or when their appearance changes.

FIG. 3A also depicts off-image content 311, which can include, for example, text 312, image(s) 313, and/or any other suitable content. Such off-image content 311 does not appear within picture 300, but can be associated with picture 300 in any of a number of different ways. Off-image content 311 can be depth-assigned, so that it can appear when rendered images are generated from picture at certain depths, and be omitted or subdued at other times. For example, according to various embodiments, a user's interactions with picture 300 (or in-image content, i.e., content that is presented as part of or within picture 300, such as tags 302) can cause off-image content 311 to be manipulated. Conversely, in at least one embodiment, a user can interact with off-image content 311 to cause picture 300 and/or in-image content such as tags 302 to be manipulated.

Figure 3C:
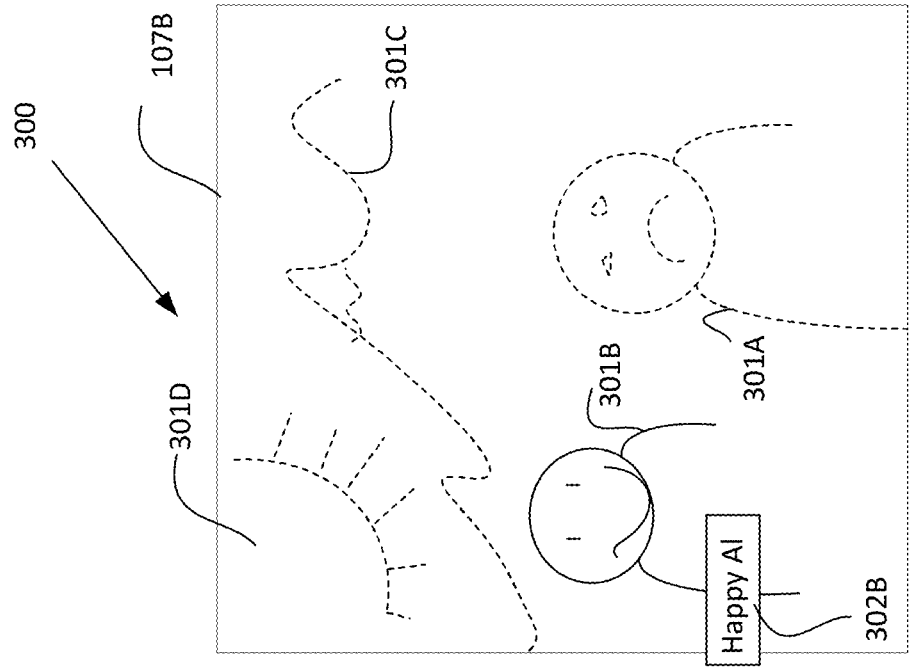
Figure 3B:
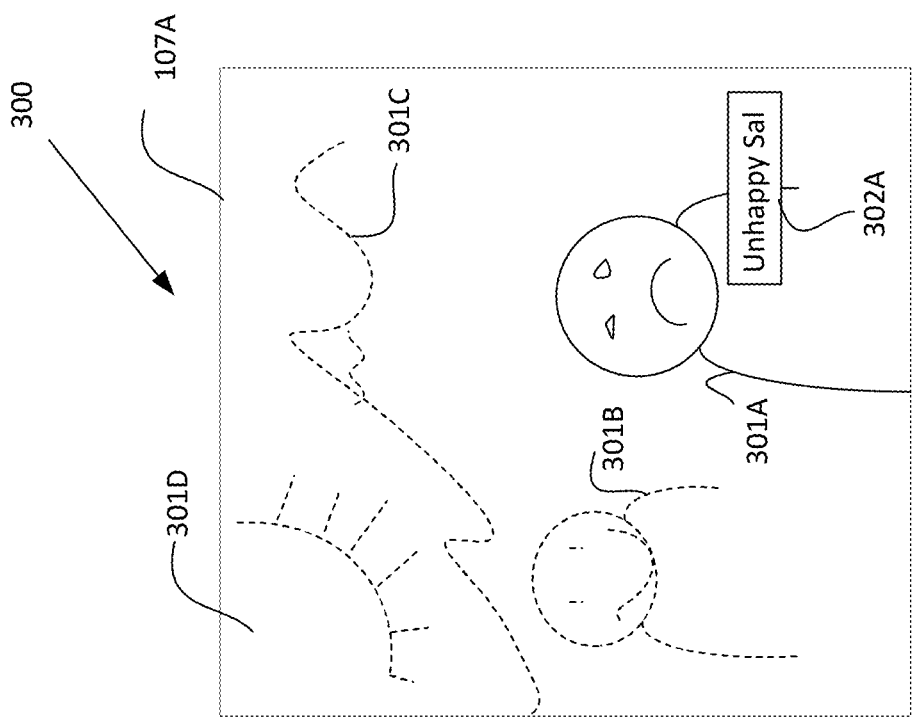

FIG. 3B depicts an example of rendered image 107A, including a view of picture 300 as it might be presented on output device 106, wherein picture 300 has been refocused at a focus depth corresponding to the depth of element 302A. Such refocusing can be done according to well known methods, and/or according to methods described in the above-referenced related patent applications. Such refocusing can be performed automatically or in response to user input. In FIG. 3B, element 301A is depicted as being in focus, while other elements 301B, 301C, 301D are out of focus (out-of-focus elements are depicted using dashed lines, for illustrative purposes). As described above, in at least one embodiment, depth-assigned content corresponding to in-focus elements 301 is displayed, while depth-assigned content corresponding to out-of-focus elements are omitted from the display. Accordingly, rendered image 107A includes tag 302A corresponding to element 301A, but omits tags 302B-E corresponding to out-of-focus elements 301B-D.

FIG. 3C depicts an example of rendered image 107B, including a view of picture 300 as it might be presented on output device 106, wherein picture 300 has been refocused at a focus depth corresponding to the depth of element 302B. In FIG. 3C, element 301B is depicted as being in focus, while other elements 301A, 301C, 301D are out of focus. Accordingly, rendered image 107B includes tag 302B corresponding to element 301B, but omits tags 302A and 302C-E corresponding to out-of-focus elements 301A, 301C, and 301D. In at least one embodiment, the transition from rendered image 107A to rendered image 107B can be performed smoothly, with tags 302A gradually fading out (or becoming more blurry) and tag 302B gradually fading in (or becoming less blurry) as the refocusing operation takes place. As described above, in at least one embodiment, tags 302 for out-of-focus elements 301 can still be displayed but in a blurry, grayed-out, or otherwise subdued or visually distinctive manner.

Figure 3D:
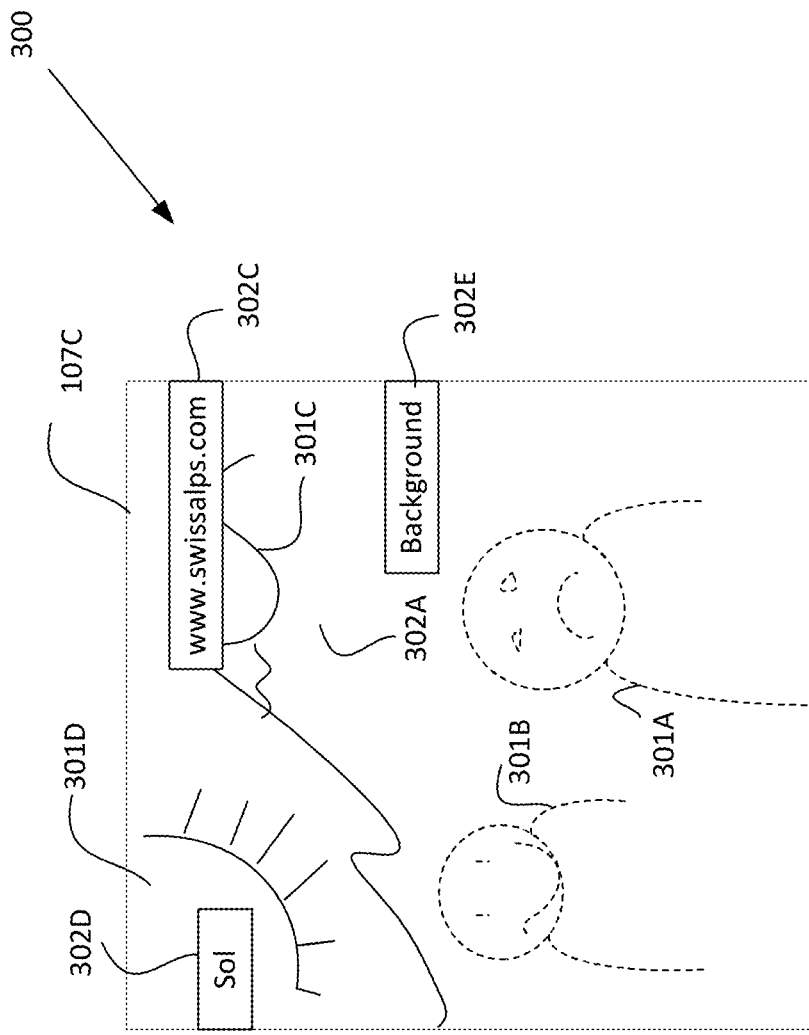

FIG. 3D depicts an example of rendered image 107C, including a view of picture 300 as it might be presented on output device 106, wherein picture 300 has been refocused at a focus depth corresponding to the depth of background elements 302C, 302D. In FIG. 3D, background elements 301C, 301D are depicted as being in focus, while other elements 301A, 301B are out of focus. Accordingly, rendered image 107C includes tags 302C, 302D corresponding to elements 301C, 301D, respectively (including interactive element 302C which contains a hyperlink), but omits tags 302A and 302B corresponding to out-of-focus elements 301A and 301B. In addition, tag 302E is shown, since it is assigned to the Z value that is currently in focus.

Referring now to FIGS. 4A through 4F, there are shown various examples of user interactions with pictures, images, and/or content, and how such interactions can cause manipulations of other pictures, images, and/or content. Such examples will be described in more detail below.

Dynamic Manipulation of Extrinsic Content in Response to Interactions with Depth-Enhanced Picture In at least one embodiment, the display of digital content that is external to the display of a depth-enhanced picture may be controlled in response to the manipulation of the depth-enhanced picture. For example, the display of the external digital content can change based on the user's interactions with data, metadata, and/or other content that has been assigned to specific depths within the foundational depth-enhanced picture. Such interactions may include, for example, clicking on elements, tapping on elements, hovering over elements, and/or the like. The content affected by such interactions can be depth-assigned in-image content and/or off-image content.

In some instances a content provider may wish to dynamically manipulate information or content that exists separately from a depth-enhanced picture in association with a user's interactions with said picture. By using the assignment of relationships between the extrinsic content and any number of depth coordinates within a picture, the extrinsic content and information may be dynamically modified when a user interacts with the depth-enhanced picture and its inherent depth information.

In at least one embodiment, such control of extrinsic content is performed by assigning content, such as data or metadata, to a set of depth coordinates within a picture. Based on associations between the extrinsic content and the depth-assigned content, a user's interactions with the depth-enhanced picture corresponding to given depth coordinates can trigger changes to the extrinsic content. For example, user interaction can cause changes to captions, text, supporting images, and/or any other content that has been associated with particular depth values.

Figure 4A:
FIGS. 4A through 4F depict various examples of user interactions with pictures, images, and/or content, and how such interactions can cause manipulations of other pictures, images and/or content.

Referring now to FIG. 4A, there is shown an example of dynamic manipulation of extrinsic content, such as depth-assigned in-image content 401, in response to user 110 interactions with depth-enhanced picture 300, according to at least one embodiment. As depicted in FIG. 4A, tags 302 are an example of such content 401, although other types of in-image content 401 may also be manipulated based on user interaction with picture 300.

Figure 4B:
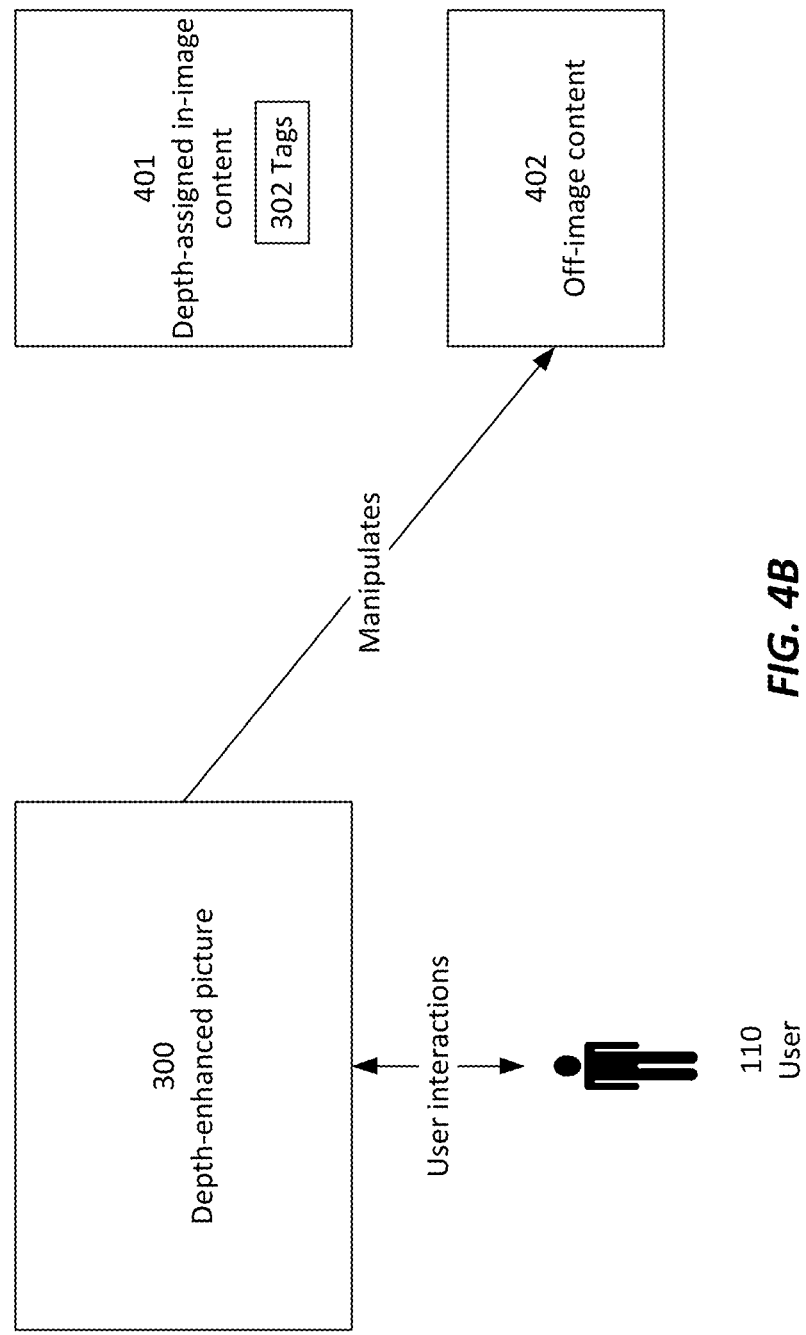

Referring now to FIG. 4B, there is shown an example of dynamic manipulation of extrinsic content, such as off-image image content 402, in response to user 110 interactions with depth-enhanced picture 300, according to at least one embodiment.

Display Additional Images in Response to Interactions.

In at least one embodiment, a publisher of digital content may wish to supplement a depth-enhanced picture by displaying any number of additional images in response to a viewer's interactions with areas of interest represented within the depth-enhanced picture. For example, a content provider may choose to display supplementary images that are closely associated with specific portions of a depth-enhanced picture that are being rendered in-focus, thereby providing relevant or explanatory content to viewers in relation to the current object of a viewer's attention. In at least one embodiment, additional content may also be provided in response to the viewer's interactions with areas of interest, such as for example text supplied as image captions or explanations. User interactions can thereby be exploited to inherently improve the delivery of information that is relevant to the active attention of a viewer, as evidenced by the viewer's interactions with a depth-enhanced picture.

Collect Information about Interactions.

In at least one embodiment, a content provider may collect information about interactions that viewers have with a depth-enhanced picture. The depth-coordinate information associated with various interactions can be used to generate information about the picture, its contents, and the various interactions users have with the picture. The information collected by observing depth-related interactions may be used in any number of ways to enable any number of useful or novel interactions. For example, such information can be used for tracking interest, facilitating automatic hotspot generation, and providing feedback and usage data to content providers.

More particularly, in at least one embodiment, publishers of a depth-enhanced picture may wish to collect data about the number of interactions a viewer has with a specific portion of the picture or a particular element or object in the picture. Such information can be useful for purposes of understanding what specific subjects, aesthetic compositions, or other qualities seem to generate interest among viewers. In at least one embodiment, a publisher may use a database collected by automatically registering depth coordinates within a depth-enhanced picture that generate particular interest; such information can then be used to set the initial rendering of the picture to be biased towards the primary point(s) of interest.

Furthermore, in at least one embodiment, collected data regarding interactions with specific portions of a depth-enhanced picture can be used to designate hotspots of attention within a picture, enabling new content to be added to the picture automatically. In such an embodiment, a content provider can be assured that areas of pictures corresponding to points of interest are visually flagged with a symbol or other highlighting effect that draws new viewers attention to automatically depth-flagged points within the picture that have been identified by previous viewers in the aggregate.

In at least one embodiment, data collected about interactions with a depth-enhanced picture may be used to denote multiple points of interest, enabling the publisher to automate dynamic rendering of the picture at multiple depths. The rendering of multiple subjects-of-interest at multiple depths may either be done simultaneously via extended-depth-of-field techniques, or by updating the picture rendering over time so that the points of interest are set as points of focus in a sequence. This technique can be used to create, in effect, a depth-related slideshow within a single depth-enhanced picture.

Collect Click-Data to Facilitate Tie-Ins to Related Data.

In at least one embodiment, the system and method of the present invention collect click data to facilitate tie-ins to databases associated with a content provider or third party, so as to track interest levels, perform data-mining, and drive narrowcasting and/or regional broadcasting based on such click data.

More particularly, in at least one embodiment, information or data collected about a given user's interactions with a depth-enhanced picture may be associated with data or metadata that has been assigned to that specific user, thereby generating information about interactions with depth-assigned content in the picture that is user-specific. Based on such collected information, new data is generated that is related to the depth-enhanced picture but extrinsic to it. The publisher may then use this information for any number of purposes as he or she sees fit. For example, a content publisher may use such information to provide the end user with content that is customized for a specific identity. The user-specific information may also be provided to parties not directly associated with the publishing of the depth-enhanced picture, enabling providers of other goods and services to use the information collected in relation to the picture and its contents for their own purposes.

For example, a social networking website may correlate information about a group of users for whom it has already established associations, and then further collect information about how each individual user interacts with a given depth-enhanced picture or set of pictures. This information can be used in any manner of ways, for example to associate how various individuals (having known associations) relate to a depth-enhanced picture, its subject matter, and/or extrinsic depth-assigned content for the picture. Such information may then be used by the publisher to bias the display of pictures to other individuals in with similar associations. This information may also be used to further enhance collected knowledge of how associated parties interact with content and with one another.

Dynamic Manipulation of Light-Field Picture in Response to Manipulation of Depth-Assigned Content In at least one embodiment, the display of a light-field picture may be dynamically manipulated in response to user interaction with controlling data, metadata, or other content that has been assigned to specific depths within the foundational light-field picture. More specifically, aspects such as focal plane(s), XYZ areas of focus, color and false-color, chrominance, lighting effects, parallax, and the like can be manipulated in response to user action such as clicks, hovers, taps, and/or other interactions with depth-assigned captions, hotspots, objects, and the like.

In this manner, based on established relationships between the extrinsic content and any number of depth coordinates within a picture, the picture itself may be dynamically modified when a user interacts with depth-assigned content. In various embodiments, the control of the depth-enhanced picture can be performed by assigning data or metadata to a set of depth coordinates within said picture, and then associating any number of interactions between the extrinsic content, the depth-assigned data or metadata, and various means of rendering the depth-enhanced picture. A user's interactions with the associated extrinsic content may thus be correlated to designated means of rendering the depth-enhanced picture in association with that extrinsic content's assigned depth coordinate, thus manipulating the rendering of the depth-enhanced picture in response to interactions with the extrinsic content.

Figure 4C:
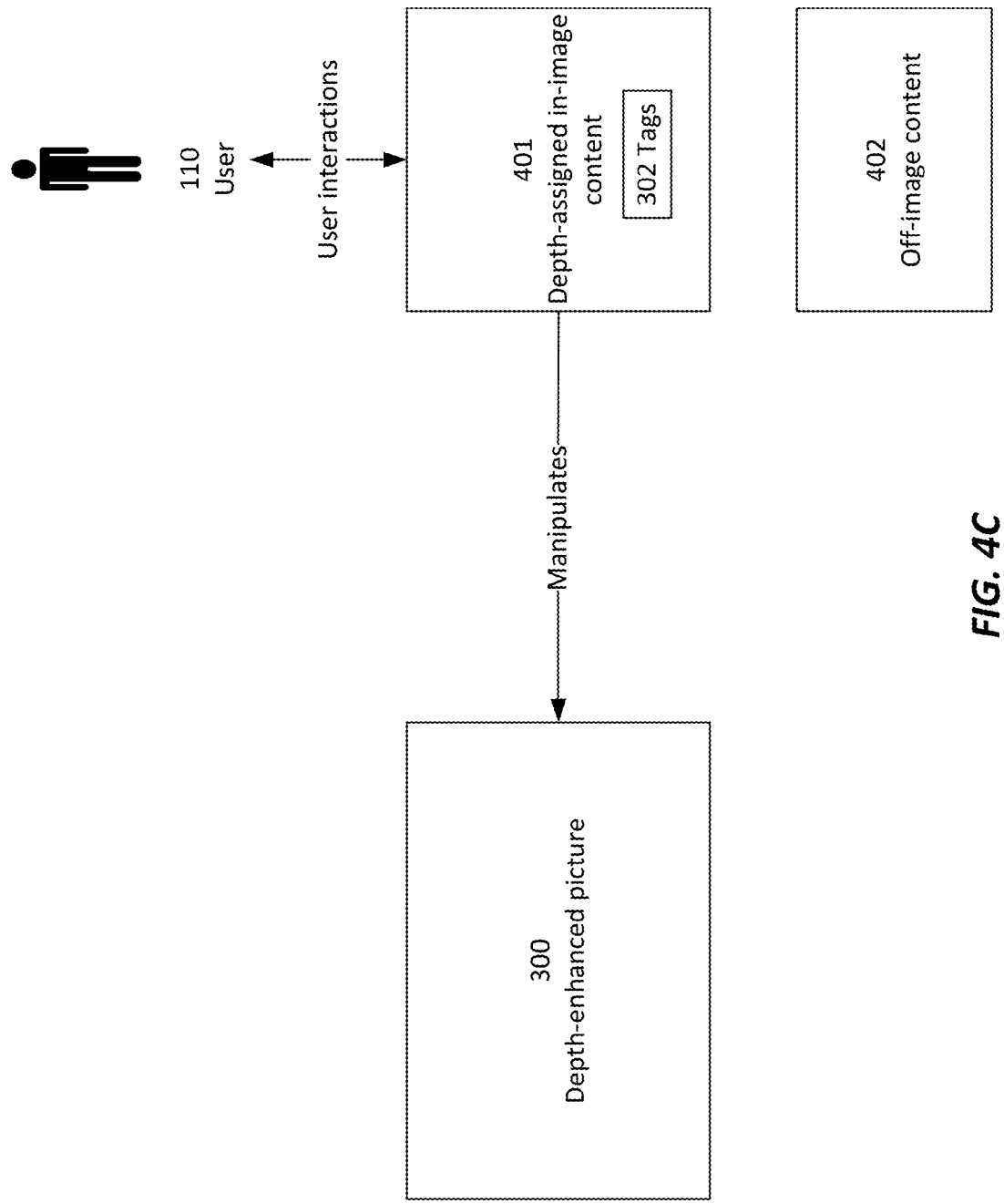

Referring now to FIG. 4C, there is shown an example of dynamic manipulation of depth-enhanced picture 300, in response to user 110 interactions with depth-assigned in-image content 401, according to at least one embodiment.

Re-Rendering a Depth-Enhanced Picture at Depths Responsive to Clicked-on Elements.

In at least one embodiment, content such as captions for any number of subjects within a depth-enhanced picture may be associated, via depth tags, with specific sets of depth coordinates in said picture. User interaction with a caption may cause the depth-enhanced picture (such as a light-field picture) to be rendered so that the subjects located at the depths that have been tagged are displayed in focus. Thus, in response to a user who clicks on multiple captions for a given depth-enhanced picture, an image can be dynamically rendered and re-rendered to display the content that is relevant to the captions the user is interacting with.

In at least one embodiment, the extrinsic content may be displayed within the visual boundaries of the depth-enhanced picture, such as through the addition of symbols that designate the presence of a point of interest within the picture. In response to user interaction with a symbol designating a hotspot, such as clicking on a star-symbol placed over a point of interest, the picture can be automatically rendered so as to generate a rendered image wherein the depth associated with that symbol is in focus.

Re-Rendering a Depth-Enhanced Picture to Sharpen Areas of Interest.

In yet another embodiment, extrinsic content such as images or a body of text that are related to the subject matter of a depth-enhanced picture may be associated with depth coordinates. When a user interacts with the supporting extrinsic content, the depth-enhanced picture may be rendered so that the resulting rendered image places emphasis on the correlated depth, bringing augmented attention to the subject matter. In this manner, the depth-enhanced picture is re-rendered to sharpen (or bring into focus) depths and/or areas of interest based on user interaction (such as clicking on supporting images, text, and/or captions associated with the image).

Dynamic Manipulation of Extrinsic Content in Response to Manipulation of Depth-Assigned Content In at least one embodiment, extrinsic content that exists independently from depth-assigned content, as well as independently from depth-enhanced pictures, may be automatically and dynamically modified in response to user manipulation of depth-assigned content, including data, metadata, and/or other content that has been assigned to specific depths within a depth-enhanced picture. This can include dynamic modification of text, separate images, videos, data, metadata, and/or other extrinsic content, in response to user interactions such as clicks, hovers, drags, or other interactions with depth-assigned content.

Once a relationship has been established between extrinsic content and depth coordinates inherent to a depth-enhanced picture, the extrinsic content may be used for purposes not directly related to the rendering of the depth-enhanced picture. In at least one embodiment, the manipulation of a depth-enhanced picture can be used to control generation of data or metadata according to techniques discussed above. In addition, such data itself may be combined with other extrinsic content to create a fuller, richer body of information. In various embodiments, any suitable type of information collected from the depth-enhanced picture can be used in conjunction with the information contained in other databases not originally related to the picture to be collected, thereby enabling the enrichment and augmentation of other data sets, the delivery of enhanced goods and services to be provided to users, and the further manipulation of digital content.

Such an approach is particularly advantageous in connection with dynamically rendered depth-enhanced pictures. The inherent interactive qualities of such pictures invite viewers to interact with such pictures. The information collected in response to such interactions may effectively be used to quantify user interest in a picture as a whole, while simultaneously identifying precisely which subjects within the depth-enhanced picture have garnered the viewer's attention. Such information is potentially important not only to the content providers who publish the depth-enhanced picture, but to any party interested in the behaviors of the image viewers and in the attention viewers give to various subjects of interest portrayed in a depth-enhanced picture.

Figure 4D:
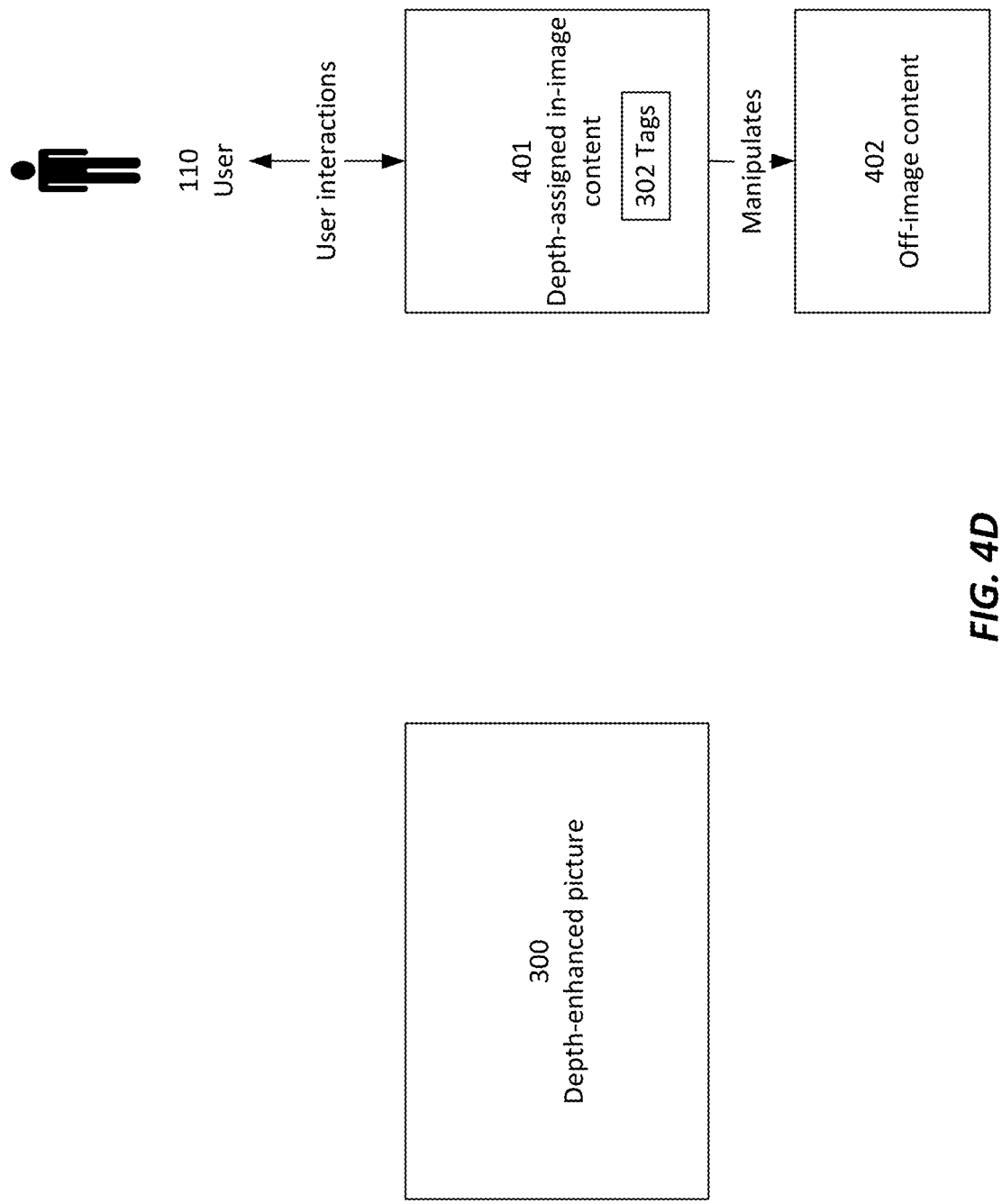

Referring now to FIG. 4D, there is shown an example of dynamic manipulation of off-image content 402, in response to user 110 interactions with depth-assigned in-image content 401, according to at least one embodiment.

Changes to Captions, Text Body, Supporting Images, and the Like in Response to Interactions with Depth-Assigned Hotspots, Pop-Ups, or Captions.

In at least one embodiment, a content provider may use interactions with content that has been associated with a depth-enhanced picture to manipulate content that is separate from the picture. For example, an individual who adds a symbol designating a point of interest at a given depth within an image may specify that an interaction with the created hotspot should also cause automatic manipulation of a caption for the subject matter. In one such scenario, a user who has tagged a picture at several XYZ coordinates to identify the names of individuals within that picture may specify that the display of names captioning a rendered image generated from the picture should be automatically highlighted in some fashion when a viewer interacts with the hotspots identifying a given individual.

Collection of Click Data.

In at least one embodiment, depth-assigned content may be used to generate yet more data or metadata, to refine analysis of existing databases, to generate new content, and/or to otherwise use the assigned information for purposes that are not necessarily directly related to the rendering of the depth-enhanced picture. For example, a content provider may wish to collect data describing what type of supplementary content provided in conjunction with depth-enhanced pictures garners more attention and interactions from content viewers. By tracking information such as what styles of hotspot symbols garner more mouse clicks, what sort of rendering effects entice users to more regularly interact with a depth-enhanced picture, and the like, a content provider may be able to improve the efficacy of their services for users and third-party customers such as advertisers.

For example, a company may use the techniques described herein to understand how products being shown in a depth-enhanced picture might be better shown to potential customers. Accordingly, the system and method of the present invention can be used to collect data associated with the picture, how users interact with the picture, and combine such information with data about the potential customers. Such information allows advertisers to refine their advertising techniques and make their use of depth-enhanced pictures more compelling.

Dynamic Manipulation of a Depth-Enhanced Picture in Response to Manipulation of Extrinsic Content Associated with Depth-Assigned Content In at least one embodiment, the display of depth-enhanced pictures, such as light-field pictures, may be automatically and dynamically manipulated in response to user interactions with extrinsic content that has been associated with controlling data, metadata, or other content that has been assigned to specific depths within the foundational light-field picture. Such manipulations can include, for example, changes to focal plane(s), XYZ areas of focus, color and false-color, lighting effects, parallax, and/or the like. Such manipulations can take place in response to user interactions with extrinsic content such as, without limitation, text, separate images, videos, data, metadata, other off-image content, and/or the like. Such manipulations can take into account any suitable factors such as, without limitation, time, point of reading in text body/page position, aggregate social weighting based on reactions of associates of the end viewer, personalized social weighting, publisher weighting, parental controls, regional laws, and the like.

Such a mechanism allows content providers to configure automatic manipulation of the rendering of depth-enhanced pictures in response to information that the provider has garnered, thereby influencing the manner in which rendered images generated from such pictures are displayed. For example, a content provider may gain access to information about the image viewer via data or metadata associated with an end user's identity, enabling the content provider to customize the rendering of a depth-enhanced picture in a way that is deemed particularly suitable for that end user. Alternatively, the content provider may tailor the end user's experience in response to information collected about the viewer's behavior in relation to the depth-enhanced content or in relation to any other content.

Figure 4E:
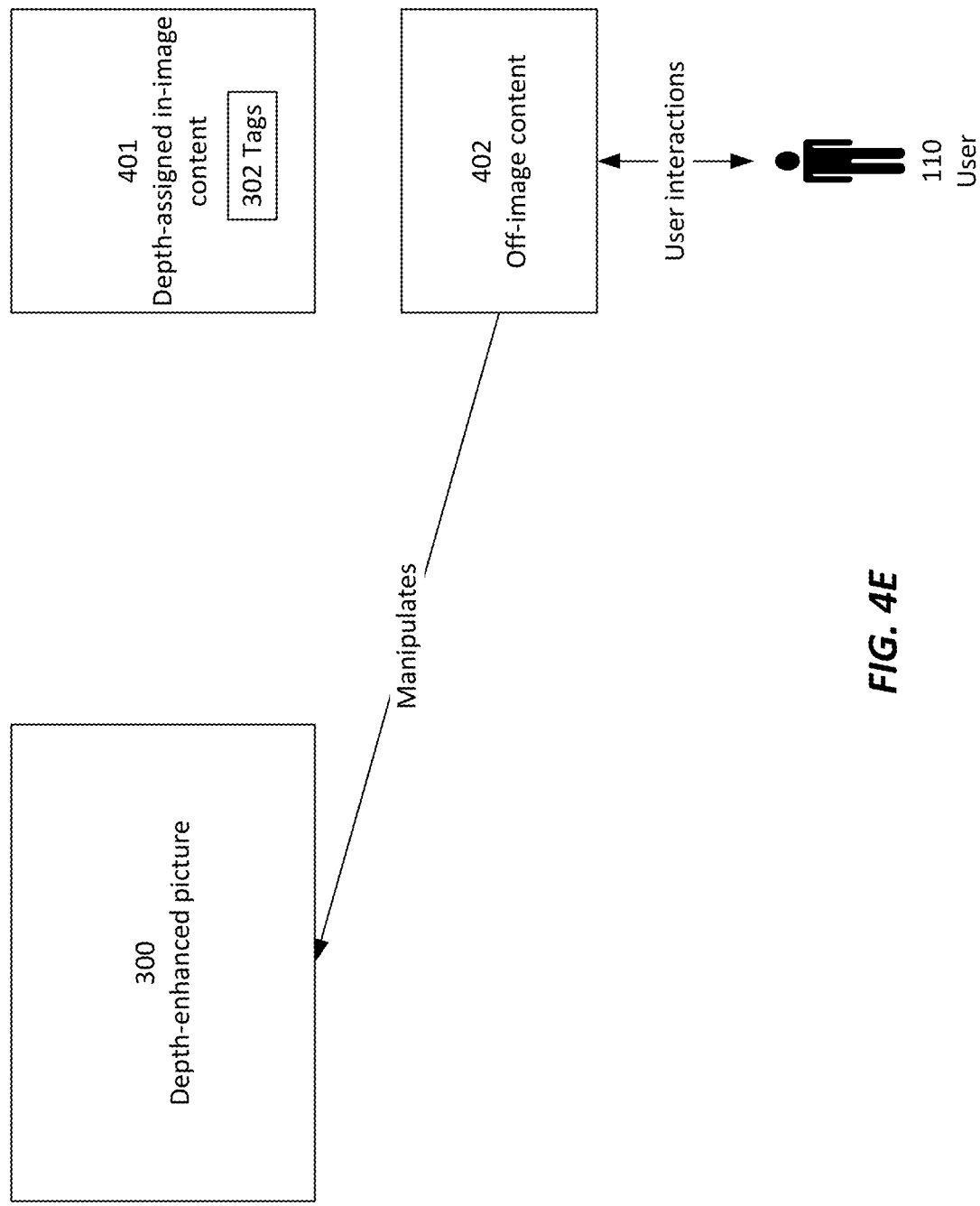

Referring now to FIG. 4E, there is shown an example of dynamic manipulation of depth-enhanced picture 300, in response to user 110 interactions with off-image content 402, according to at least one embodiment.

Figure 4F:
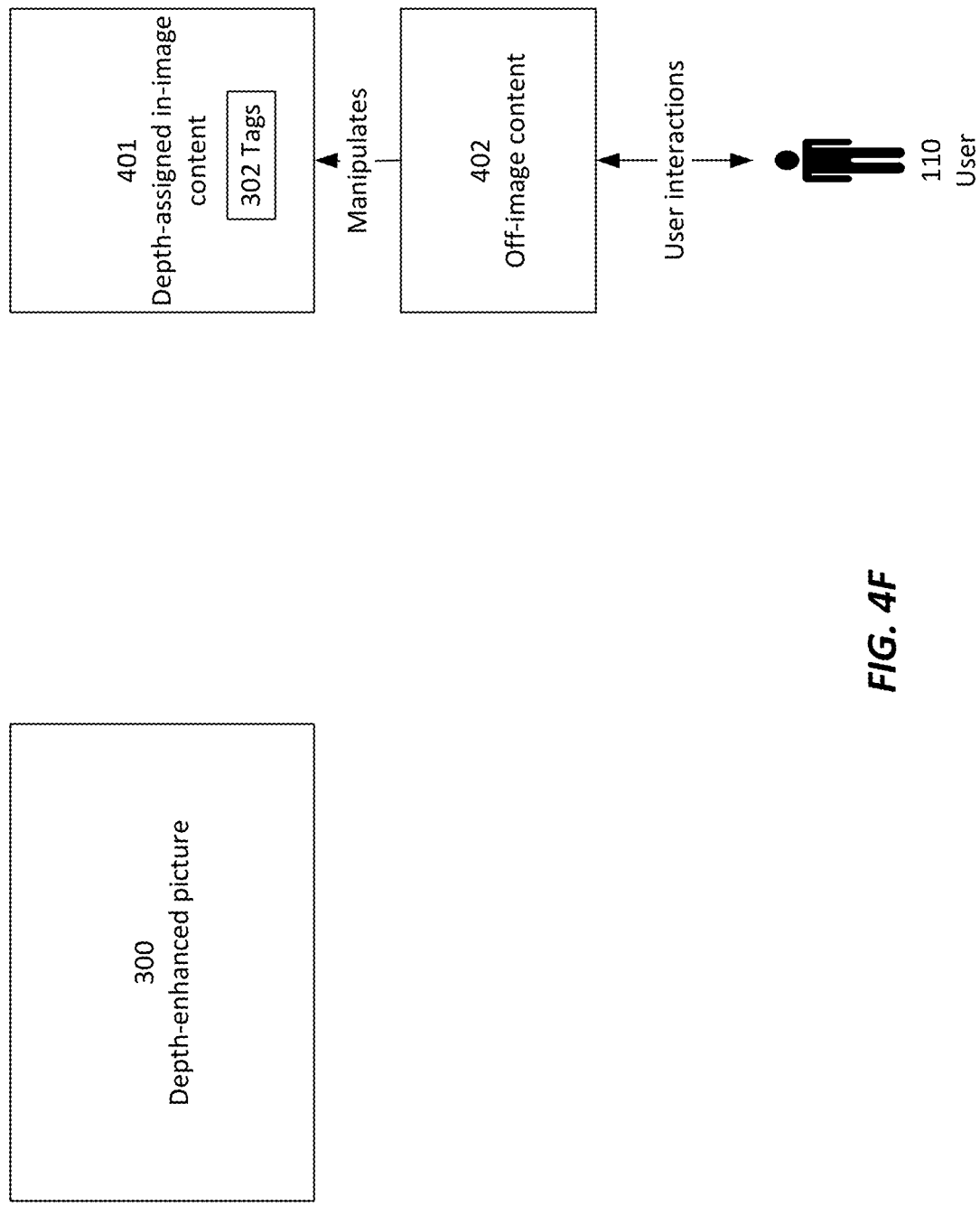

Referring now to FIG. 4F, there is shown an example of dynamic manipulation of depth-assigned in-image content 401, in response to user 110 interactions with off-image content 402, according to at least one embodiment.

Rendering of Depth-Enhanced Picture at Depth to Place Emphasis on Selected Subject Matter.

In at least one embodiment, a content provider may gain access to information about a specific end user's preferences for content, for example by means of data and/or metadata associated with the user's digital identity. This user data and/or metadata may be garnered by the content provider or by a third-party provider of user information; for example, via social networking websites. This data and/or metadata can then be used to render depth-enhanced pictures in a fashion that is particularly well-suited to that end user. Such determination can be based, for example, on reactions to content of other individuals who are "friends" of the end user on a social network. Thus, the reactions and preferences of those individuals who have an affinity to or an association with the end user can be taken into account.

For example, a content provider may use information provided by a third-party social networking site to identify an end user as a known associate of other individuals who have previously interacted with a given depth-enhanced picture. The content provider may assume that the end user will respond favorably to the same content that the user's associates have interacted with. The content provider may thus use data and metadata that is otherwise extrinsic to a depth-enhanced picture to render the picture in a customized manner for a particular end user.

Modifying Depth-Enhanced Pictures to Change Emphasis on Subject Matter in Response to Social Weighting and/or Content Provider Emphasis.

In at least one embodiment, a content provider may wish to modify the display of the depth-enhanced picture to add or reduce emphasis upon the subjects of the image. Such modifications can include, for example, application of false colors, changes in image color saturation, changes to digitally-applied lighting effects, and/or other digital manipulations. The modifications can be targeted at subjects located at specific sets of XYZ coordinates within a depth-enhanced picture. These modifications may be applied in a static manner, so that they have constant effect all times, or they may be dynamically changed during rendering of the depth-enhanced picture so as to emphasize different subjects at different depths at different times.

In at least one embodiment, such changes in visual emphasis may also be applied automatically in response to any data and/or metadata associated with the end user. The rendering of the depth-enhanced picture may be modified based on social weighting that is relevant to the end user, as discussed previously. Again, such changes in visual emphasis can be based, for example, on reactions to content of other individuals who are "friends" of the end user on a social network. Thus, the reactions and preferences of those individuals who have an affinity to or an association with the end user can be taken into account.

In at least one embodiment, changes to visual emphasis can be applied in response to manual control by a content provider or other entity. For example, a content provider may modify a picture so as to emphasize and/or de-emphasize various subjects. This gives the content provider enhanced control over the display and perception of depth-enhanced pictures. For example, a picture can be modified so that its color is de-saturated until it appears in grayscale when it is rendered at one set of depth coordinates, while at another set of depth coordinates the entire picture, or portions of it, may be rendered in full color. This allows the content provider to place visual emphasis on certain subjects at the colored depths, while de-emphasizing the subjects that an end user sees when the picture is rendered at the de-saturated depths.

Restricting Presentation of Content at Specific Depths.

In at least one embodiment, a content provider or other individual may use the techniques of the present invention to selectively restrict the presentation of subjects portrayed in a depth-enhanced picture. For example, certain portions of the content can be restricted to provide anonymity to individuals portrayed in a picture, to censor confidential information, to prevent children from observing content that is inappropriate for their level of maturity, to restrict access to information to users who have paid for access to content, to modify access for users from a variety of different geopolitical or regional demographics, and/or the like. Restrictions can be based on any suitable factor or factor(s), including the identity, age, and/or authorization credentials of the person attempting to view the content.

According to various embodiments of the present invention, depth-enhanced pictures may be rendered in a dynamic fashion; thus, it is possible to localize the restriction of visual access to depth-specific portions of an image. For example, a content provider may enable a depth-enhanced picture to viewable to the general public, while only allowing certain individuals (or groups of individuals) to see depths of the picture that portray certain personal or sensitive information. Such a technique can also be used to ensure that children cannot see content that is inappropriate, by disabling viewing of content of certain depths to those who have not been age-verified.

In at least one embodiment, those depths of the picture that are deemed inappropriate or are not to be shown to certain users can be blocked entirely from viewing by those users; alternatively they can be obscured, blurred, darkened, or otherwise deemphasized when viewed by those users. For example, an individual may publish pictures of their family vacation so that anyone may view the beaches in the background, while the faces of the family members in the foreground may be blurred out unless viewed by known friends and family. In at least one embodiment, a depth-assigned content item can be configured so that it obscures some sensitive element of the picture; the depth-assigned content item might then be included when the image is being viewed by a user that is not authorized to see the sensitive element, and omitted when the image is being viewed by a user that is authorized to see the sensitive element.

A determination of which users are authorized to view the non-blurred versions (or to view an image without an obscuring content item) can be based on user authentication (by password entry), and/or by data or metadata gathered from social networking services, and/or by any other suitable means. Restrictions can be based on geographic location, customer status, payment information, and/or any other viewer-specific or group-based information.

Rendering Depth-Enhanced Picture at Selected Depths in a Predetermined Order.

In at least one embodiment, the techniques of the present invention can be used to allow a content provider or other individual to control how a depth-enhanced picture (such as a light-field picture) is dynamically presented. For example, the content provider or other individual can configure the system of the present invention to render a depth-enhanced picture dynamically, presenting certain selected depths in a predetermined order, so as to generate, in effect, a slide show containing different views of the same depth-enhanced picture. Each such view can be a rendered image at a different depth. Any number of depth coordinates may be established as points of interest to be the focus of the image as it is dynamically rendered at different depths over the course of some defined time period. The presentation can be configured to have certain predefined timing, so that each depth is presented at a particular time and/or for a particular length of time. Alternatively, the presentation can be configured so that the next depth is presented in response to a trigger event, such as the end viewer clicking on a "next" button. In at least one embodiment, transitions from one depth to the next can be made smooth, and/or any suitable transition effect can be shown. The sequence of depth coordinates to be shown may be specified manually by the content provider or some other individual, or automatically, for example in response to an automated analysis of data and/or metadata associated with depth coordinates within the picture.

In at least one embodiment, once specific depth coordinates of interest have been determined, the order in which they may be displayed may be determined manually, automatically, or randomly. The content provider or other individual can specify the time it takes to shift between the coordinates at which the picture will be rendered, or such time period can be determined automatically or randomly. Once the depth coordinates, the order in which they will be rendered, and the time between renderings have been determined, the depth-enhanced picture may be displayed so that it is dynamically rendered over a period of time. This automatic rendering of the depth-enhanced picture can then be presented to viewers as a seamless series of changes between points of interest within a picture, creating an immersive experience without requiring any active participation on the part of the end viewer.

In at least one embodiment, additional content associated with depth coordinates within the picture may also be displayed in a dynamic manner over the course the time period in which the depth-enhanced picture is being presented. Such display of additional content can take place, for example, in tandem with the rendering of the picture at corresponding depths, so that the additional content being displayed at any given moment relates to the presentation at that moment. For example, in presenting a picture that has captions associated with various depth coordinates, the captions may be dynamically changed as the picture is dynamically rendered in time. This presents the image viewer with a video-like rendered image in which the various subjects of a depth-enhanced picture are presented one at a time to the viewer with both a changing rendering of the visual scene and its associated textual captioning.

Such an implementation provides content providers great control over how their depth-enhanced pictures will be experienced, adding a temporal element to the display of the picture. This may be considered to add yet another dimension of rendering control to the depth-enhanced picture, adding time "T" to the XYZ coordinates of an image. Content providers and publishers who wish to do so may use these XYZT coordinate to exert great control over how their content is presented.

One example of an application of such an embodiment is to create a depth-enhanced picture with subjects that the provider would like to reveal in a specific sequence and/or at a specific pace, enabling a visual story to be told within a single depth-enhanced picture (or set of depth-enhanced pictures). For example, an image viewer can first be presented with a subject of interest in the foreground of an image, such as a running cat, so that the viewer is familiar with the subject before revealing another subject in the background, such as a dog chasing the cat, thereby creating a story within a given depth-enhanced picture. By automating the rendering of multiple subjects within an image over a specified time, the time-enhanced display of a depth-enhanced picture can provide a unique and compelling opportunity for visual storytelling. In at least one embodiment, such display can be extended to a plurality of depth-enhanced pictures, shown in sequence, with at least a subset of such pictures being presented dynamically according to the techniques described herein.

Rendering Depth-Enhanced Picture at Depth in Response to Perceived Readiness of Viewer.

In at least one embodiment, the extrinsic content may be a body of text, such as a portion of a written article for which a depth-enhanced picture is being used as an illustration. In such an embodiment, the depth-enhanced picture can be automatically rendered to place emphasis on depth-tagged subjects that relate to a particular portion of the text body, based on a user's interaction with the related portion. For example, a user may be presumed to be reading a specific portion of an article based on the current scroll position being displayed, the position of a mouse cursor, tracking of eye movements, by user input explicitly indicating a location, and/or by other means. The presentation of an associated depth-enhanced picture can be configured to automatically render the picture in a manner that presents and/or emphasizes subjects at depth(s) that correspond(s) to the subject matter of the text indicated by the user's current position within the document.

Display of Depth-Assigned, Extrinsic Content in Response to the Manipulation of Associated Extrinsic Content In at least one embodiment, content that has been assigned to specific depths of a depth-enhanced picture, such as a light-field picture, but that is not intrinsic to the captured picture, may be displayed within a rendered image in a fashion that is contingent upon any manner of interactions between content that has been associated with controlling content that has been assigned to specific depths within the foundational depth-enhanced picture.

Such a mechanism facilitates the dynamic display of content such as text, watermarks, images, digitally inserted objects, and/or the like, in response to user interaction with associated content such as text, separate images, videos, data, metadata, and/other off-image content. Any type of user interaction with the associated content can be considered, including for example direct manipulation, time of viewing, point of reading in text body/page position, aggregate social weighting of the content and/or the user, personalized social weighting, publisher weighting, parental controls, regional laws, and/or the like.

More particularly, for example, content assigned to specific XYZ coordinates may be rendered within the rendered image only in response to situations in which the content provider (or another individual) deems it important to do so. Content providers can thereby cause the rendering of depth-enhanced pictures to be automatically controlled in response to information that the provider has garnered, thereby influencing the manner in which the rendered image is displayed.

For example, a content provider may gain access to information about a user viewing an image via data or metadata associated with the user's identity. This enables the content provider to customize the rendering of supplementary information within the depth-enhanced picture in a way that is deemed particularly suitable for that user. In at least one embodiment, the content provider may tailor the end user's experience in response to information collected about the viewer's behavior in relation to the depth-enhanced content or in relation to any other content.

In at least one embodiment, the control of extrinsic content is performed by assigning content to a set of depth coordinates within an image and then associating any number of interactions between extrinsic content and the assigned content. In such a context, a user's interactions with the depth-enhanced picture corresponding to certain depth coordinates may be used to trigger a cascade of associations and manipulate the extrinsic content as described herein.

Rendering of Hotspots or Pop-Ups at Depth in Response to Social Weighting.

In at least one embodiment, a content provider or other individual may gain access to information about the image viewer via data or metadata associated with an end user's identity, enabling the content provider to customize the rendering of supplementary information within the depth-enhanced picture in a way that is deemed particularly suitable for that particular end user. For example, a display of icons designating XYZ points of interest within a depth-enhanced picture may be generated automatically for a given end user by promoting the particular interests of that user's known social associates, as determined via information gleaned from a social networking website and/or other source(s). In such an embodiment, observation of a user's known social associates, as determined by data and metadata gathered from social networking websites and/or the like, and aggregation of depth-related interactions with a picture can be used to determine points of interest. In this manner, users associated with a given social circle may be presented with a depth-enhanced picture that has been digitally marked in some fashion to designate points of interest relevant to the group.

Rendering of Hotspots or Pop-Ups at Depth in Response to Characteristics of User.

In at least one embodiment, factors such as customer status, preferences, identity, geographic group, demographic group, behavior, and/or the like, can be used to automatically manipulate the rendering of elements such as hotspots and/or pop-ups. More generally, the addition of extrinsic content to a depth-enhanced picture, or various modifications to it, may either be promoted or restricted based on information that has been gathered about an end user's preferences, behavioral patterns and/or other factors.

For instance, one user may prefer that rendered images be heavily marked with points of interest, so as to provide a display of maximum information about subjects portrayed within an image at different depths. Another user may prefer more selective display of information. Such preferences may be established broadly by the user of a depth-enhanced picture delivery service, enabling a user to specify the characteristics of rendered images for personalized viewing.

As another example, if a user consistently closes or ignores captions associated with a specific class of image subjects, such behavioral information can be collected and used to avoid or limit the presentation of such content in accordance with preferences determined based on that user's behavior.

In at least one embodiment, a content provider or other individual may configure the system of the present invention to render advertisements at various coordinates within a depth-enhanced picture in response to any of a number of suitable factors, such as the status and/or other characteristics of the end user. In at least one embodiment, display of rendered images can be configured so that end users can pay for premium services in which advertising is omitted from rendered images; for other users who do not pay for such premium services, advertisements may be digitally inserted at particular depths within the depth-enhanced picture, for presentation in connection with display of rendered images at those depths.

In at least one embodiment, digital watermarks can be inserted at certain locations and depths of a depth-enhanced picture, such as over subjects of interest located at specific depth coordinates within the image. When rendered images are presented to paying customers, the watermarks can be selectively and/or automatically disabled.

In at least one embodiment, a content provider may configure the system so that modifications are applied to the content provider's content in a restricted fashion and at selected depth(s), so as to minimize the visual impact of the image modification. For example, a digital news publisher may choose to place a black bar over the eyes of an individual who has been accused of a crime, protecting his or her identity. The publisher may wish to draw an end user's attention to the story by displaying a depth-enhanced picture in which the accused is led out of a courthouse surrounded by guards, rendering the picture to generate a rendered image in which the surrounding officers are shown in focus, while the accused is located on a depth-plane that is out of focus in a fashion that is consistent with the display of normal depth-enhanced pictures. If an end user changes the plane of focus so that the face of the accused would be brought into focus, the black bar or other obscuring element can be introduced, so as to block the viewing of the person's face. In this manner, the picture can be selectively censored only when it is being viewed at a depth-plane that would otherwise show the person's face in focus. This provides a mechanism by which the display of content is restricted in such a manner as to have minimal disruptive impact on the overall viewing experience.

Application to Machine-Readable Codes

In at least one embodiment, the depth-assigned content can include one or more machine-readable codes, such as Quick Response (QR) codes that can be scanned optically. This allows such machine-readable codes to be embedded in a depth-enhanced picture such as a light-field picture. Each machine-readable code can be associated with a particular depth, so that, according to the techniques described herein, the machine-readable code is rendered as part of the rendered image only when the depth-enhanced picture is refocused at a matching focus depth (or within a specified tolerance). Machine-readable codes that are not indexed to the Z-coordinate value corresponding to the depth at which the picture is being rendered may be omitted, or may be displayed in a subdued format (e.g. by being blurred, grayed out, or otherwise visually distinguished). In at least one embodiment, wherein the tolerance is specified, machine-readable codes that are indexed to a Z-coordinate value outside the tolerance value with respect to the depth at which the picture is being rendered may be omitted or displayed in a subdued format.

In at least one embodiment, the greater the distance between the Z-coordinate value assigned to a machine-readable code and the depth at which the picture is being rendered, the more pronounced is the subduing effect. Thus, the machine-readable code may be more or less grayed out, or more or less blurred, based on the difference between the Z-coordinate value of the machine-readable code and the depth of the rendered image.

Such a technique allows advertisers to create more interactive digital assets more quickly. For example, an advertiser can generate a light-field picture containing QR codes which directly link to relevant websites and/or other resources. The QR codes can be associated with different XYZ coordinates within the image, including two-dimensional position as well as depth. By providing different QR codes at different areas and depths, the advertiser can generate content that has more interactivity and faster action-taking by the consumer than previously available.

Clicking on a machine-readable code (such as a QR code) can cause any suitable action to take place. For example, in at least one embodiment, clicking on a code can take the user to a webpage or website, or can cause some resource to be downloaded and/or activated.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for manipulating depth-assigned content associated with a depth-enhanced virtual reality image, comprising:
    at a processor, receiving a depth-enhanced virtual reality image comprising a plurality of elements having different depth values;
    at the processor, receiving a depth-assigned content item, the depth-assigned content item being associated with the depth-enhanced virtual reality image and being assigned to a first depth value;
    at the processor, determining a focus depth for rendering of the depth-enhanced virtual reality image, wherein at least a first one of the elements has a depth that is closer to the focus depth than the depth of at least a second one of the elements;
    at the processor, determining whether to include the depth-assigned content item in rendering the depth-enhanced virtual reality image based on a determination as to whether the first depth value falls within a predetermined tolerance value of the determined focus depth;

at an image rendering component, rendering the depth-enhanced virtual reality image so that the first element is more in focus than the second element;
at the image rendering component:
responsive to the determination indicating that the depth-assigned content item should be included, including the depth-assigned content item in the rendered depth-enhanced virtual reality image;
responsive to the determination indicating that the depth-assigned content item should not be included, omitting the depth-assigned content item from the rendered depth-enhanced virtual reality image; and
outputting the rendered depth-enhanced virtual reality image at an output device.

2. The method of claim 1, wherein the depth-enhanced virtual reality image comprises a computer-generated image.

3. The method of claim 1, wherein the depth-enhanced virtual reality image comprises a combination of a captured image and a computer-generated image.

4. The method of claim 1, wherein:
the depth-assigned content item is assigned to a location within the depth-enhanced virtual reality image; and
rendering the depth-enhanced virtual reality image to generate a rendered image including the depth-assigned content item comprises rendering the depth-assigned content item at the location to which it is assigned.

5. The method of claim 4, wherein the position within the depth-enhanced virtual reality image is indicated as a coordinate value in three-dimensional space.

6. The method of claim 1, wherein determining a focus depth comprises receiving, at an input device, user input specifying a focus depth.

7. The method of claim 1, wherein determining a focus depth comprises automatically determining the focus depth.

8. The method of claim 1, wherein determining whether to include the depth-assigned content item in rendering the depth-enhanced virtual reality image comprises determining whether the first depth value equals the determined focus depth.

9. The method of claim 1, wherein rendering the depth-enhanced virtual reality image to generate a rendered image including the depth-assigned content item comprises:
responsive to the first depth value falling outside the predetermined tolerance value of the determined focus depth, rendering the depth-enhanced virtual reality image to generate a rendered image including a subdued representation of the depth-assigned content item.

10. The method of claim 9, wherein the subdued representation of the depth-assigned content item comprises at least one selected from the group consisting of:
a grayed out representation of the depth-assigned content item; and
a blurred representation of the depth-assigned content item.

11. The method of claim 1, further comprising:
at the processor, determining a second focus depth for rendering of the depth-enhanced virtual reality image;
at the processor, determining whether to include the depth-assigned content item in rendering the depth-enhanced virtual reality image, based on a determination as to whether the first depth value falls within a predetermined tolerance value of the determined second focus depth;
at the image rendering component, responsive to the determination indicating that the depth-assigned content item should be included, and responsive to the previous determination indicating that the depth-assigned content item should not be included, re-rendering the depth-enhanced virtual reality image to introduce the depth-assigned content item into the rendered image;
at the image rendering component, responsive to the determination indicating that the depth-assigned content item should not be included, and responsive to the previous determination indicating that the depth-assigned content item should be included, re-rendering the depth-enhanced virtual reality image to dismiss the depth-assigned content item from the rendered image;
outputting the rendered image at an output device.

12. The method of claim 1, wherein the depth-assigned content item comprises at least one selected from the group consisting of:
a tag;
an annotation;
a comment;
a text item;
an image;
an interactive element;
a hyperlink;
a reference to a document; and
a reference to a resource.

13. The method of claim 1, wherein the depth-assigned content item comprises a machine-readable code.

14. The method of claim 1, wherein the depth-assigned content item comprises at least one selected from the group consisting of:
in-image content; and
off-image content.

15. The method of claim 1, further comprising:
at a user input device, receiving user input indicating an interaction with the depth-enhanced virtual reality image; and
responsive to the interaction with the depth-enhanced virtual reality image, causing a change to the depth-assigned content item.

16. The method of claim 15, wherein causing a change to the depth-assigned content item comprises causing at least one additional content item to be displayed.

17. The method of claim 15, wherein receiving user input indicating an interaction with the depth-enhanced virtual reality image comprises collecting information about user interaction with the depth-enhanced virtual reality image, the method further comprising:
determining at least one point of interest based on the collected information.

18. The method of claim 15, wherein receiving user input indicating an interaction with the depth-enhanced virtual reality image comprises determined a direction of user gaze, the method further comprising:
determining at least one point of interest based on the determined direction of user gaze.

19. The method of claim 1, further comprising:
at a user input device, receiving user input indicating an interaction with the depth-assigned content item; and
responsive to the interaction with the depth-enhanced virtual reality image, causing a change to the depth-enhanced virtual reality image.

20. The method of claim 19, wherein causing a change to the depth-enhanced virtual reality image comprises re-rendering the depth-enhanced virtual reality image at a depth responsive to the received user input.

21. The method of claim 20, wherein re-rendering the depth-enhanced virtual reality image at a depth responsive to the received user input comprises bringing into focus an area indicated to be of interest based on the received user input.

22. The method of claim 20, wherein re-rendering the depth-enhanced virtual reality image at a depth responsive to the received user input comprises emphasizing an area indicated to be of interest based on the received user input.

23. The method of claim 20, wherein receiving user input indicating an interaction with the depth-assigned content item comprises receiving user input indicating an interaction with extrinsic content associated with the depth-assigned content item.

24. The method of claim 1, wherein the depth-assigned content item is associated with an additional content item, the method further comprising:
   at a user input device, receiving user input indicating an interaction with the depth-assigned content item; and
   responsive to the interaction with the depth-enhanced virtual reality image, causing a change to the additional content item.

25. The method of claim 24, wherein the additional content item comprises content separate from the image.

26. The method of claim 24, wherein receiving user input indicating an interaction with the depth-enhanced content item comprises collecting information about user interaction with the depth-enhanced content item, the method further comprising:
   determining at least one point of interest based on the collected information.

27. The method of claim 1, further comprising:
   receiving an indication of popularity of a depth-assigned content item in a social networking environment; and
   responsive to the received indication, causing a change to the depth-enhanced virtual reality image.

28. The method of claim 1, wherein the depth-assigned content, when included, selectively obscures an element of the virtual reality image, and wherein determining whether to include the depth-assigned content item in rendering the depth-enhanced virtual reality image comprises determining whether a user is not authorized to view the element.

29. The method of claim 1, wherein determining whether to include the depth-assigned content item in rendering the depth-enhanced virtual reality image comprises determining whether a user is authorized to view the depth-assigned content.

30. The method of claim 29, wherein determining whether a user is authorized to view the depth-assigned content comprises receiving user login information and performing user authentication.

31. The method of claim 1, further comprising:
   at the processor, receiving a predefined sequence of display depths; and
   at the image rendering component, successively presenting the depth-enhanced virtual reality image at each display depth in the received sequence.

32. The method of claim 31, wherein the predefined sequence of display depths specifies a time period for each of at least a subset of the display depths;
   and wherein successively presenting the depth-enhanced virtual reality image at each display depth comprises, for each display depth, presenting the depth-enhanced virtual reality image for the specified time period.

33. The method of claim 31, wherein successively presenting the depth-enhanced virtual reality image at each display depth in the received sequence comprises:
   at the image rendering component, presenting the depth-enhanced virtual reality image at the first display depth in the sequence;
   at the processor, receiving an indication of a trigger event for proceeding to the next display depth in the sequence;
   at the image rendering component, responsive to the trigger event, presenting the depth-enhanced virtual reality image at the next display depth in the sequence; and
   repeating the steps of receiving an indication of a trigger event and presenting the depth-enhanced virtual reality image at the next display depth, until the depth-enhanced virtual reality image has been presented at the last display depth in the sequence.

34. The method of claim 33, wherein the trigger event comprises user input received at an input device.

35. The method of claim 31, wherein successively presenting the depth-enhanced virtual reality image at each display depth in the sequence comprises, for each display depth, performing the steps of:
   at the processor, determining whether to include the depth-assigned content item in rendering the depth-enhanced virtual reality image, based on a determination as to whether the depth value of the depth-assigned content item falls within a predetermined tolerance value of the display depth;
   at an image rendering component, responsive to the determination indicating that the depth-assigned content item should be included, rendering the depth-enhanced virtual reality image to generate a rendered image including the depth-assigned content item;
   at the image rendering component, responsive to the determination indicating that the depth-assigned content item should not be included, rendering the depth-enhanced virtual reality image to generate a rendered image omitting the depth-assigned content item; and
   outputting the rendered image at the output device.

36. The method of claim 1, wherein determining whether to include the depth-assigned content item in rendering the depth-enhanced virtual reality image comprises determining readiness of a user to view the depth-assigned content item.

37. The method of claim 36, wherein determining readiness of a user to view the depth-assigned content item comprises determining direction of user gaze to determine which portion of a plurality of portions of a related content item is currently being viewed by a user.

38. The method of claim 36, wherein determining whether to include the depth-assigned content item in rendering the depth-enhanced virtual reality image comprises:
   at the processor, determining at least one affinity between the user and at least one other entity; and
   at the processor, determining whether to include the depth-assigned content item based on at least one reaction of the at least one other entity to the depth-assigned content item.

39. The method of claim 38, wherein the at least one other entity comprises at least one entity associated with the user via a social network.

40. The method of claim 38, wherein determining whether to include the depth-assigned content item based on at least one reaction of the at least one other entity to the depth-assigned content item comprises determining whether to include the depth-assigned content item based on aggregated reactions of a plurality of other entities to the depth-assigned content item.

41. The method of claim 36, wherein determining whether to include the depth-assigned content item in rendering the depth-enhanced virtual reality image comprises:

at the processor, determining at least one affinity between the user and at least one other entity; and at the processor, determining whether to include the depth-assigned content item based on at least one reaction of the at least one other entity to at least one content item having affinity to the depth-assigned content item.

42. The method of claim 1, further comprising, prior to receiving the depth-enhanced virtual reality image:
associating at least one content item with a depth-enhanced virtual reality image; and
assigning each content item to at least one depth value.

43. A method for presenting a series of renderings of a depth-enhanced virtual reality image, comprising:
at a processor, receiving a depth-enhanced virtual reality image comprising a plurality of elements having different depth values;
at the processor, receiving at least one depth-assigned content item, each depth-assigned content item being associated with the depth-enhanced virtual reality image and being assigned to a content item depth value;
at the processor, receiving a predefined sequence of display depths for rendering of the depth-enhanced virtual reality image, wherein, for each display depth in the sequence, at least a first one of the elements has a depth that is closer to the display depth than the depth of at least a second one of the elements; and
at an image rendering component, successively presenting the depth-enhanced virtual reality image at each display depth in the sequence;
wherein successively presenting the depth-enhanced virtual reality image at each display depth in the sequence comprises, for each display depth in the sequence:
at the processor, determining whether to include each depth-assigned content item in rendering the depth-enhanced virtual reality image, based on a determination as to whether the depth value for each depth-assigned content item falls within a predetermined tolerance value of the display depth;
at an image rendering component, rendering the depth-enhanced picture so that the first element is more in focus than the second element;
at the image rendering component:
responsive to the determination indicating that at least one depth-assigned content item should be included, including the at least one depth-assigned content item in the rendered depth-enhanced virtual reality image; and
responsive to the determination indicating that no depth-assigned content item should be included, omitting the at least one depth-assigned content item from the rendered depth-enhanced virtual reality image; and
outputting the rendered virtual reality image at an output device.

44. A computer program product for manipulating depth-assigned content associated with a depth-enhanced virtual reality image, comprising:
a non-transitory computer-readable storage medium; and
computer program code, encoded on the medium, configured to cause at least one processor to perform the steps of:
receiving a depth-enhanced virtual reality image comprising a plurality of elements having different depth values;
receiving a depth-assigned content item, the depth-assigned content item being associated with the depth-enhanced virtual reality image and being assigned to a first depth value;
determining a focus depth for rendering of the depth-enhanced virtual reality image, wherein at least a first one of the elements has a depth that is closer to the focus depth than the depth of at least a second one of the elements;
determining whether to include the depth-assigned content item in rendering the depth-enhanced virtual reality image based on a determination as to whether the first depth value falls within a predetermined tolerance value of the determined focus depth;
rendering the depth-enhanced virtual reality image so that the first element is more in focus than the second element;
responsive to the determination indicating that the depth-assigned content item should be included, including the depth-assigned content item in the rendered depth-enhanced virtual reality image;
responsive to the determination indicating that the depth-assigned content item should not be included, omitting the depth-assigned content item from the rendered depth-enhanced virtual reality image; and
causing an output device to output the rendered depth-enhanced virtual reality image.

45. The computer program product of claim 44, wherein the depth-enhanced virtual reality image comprises a computer-generated image.

46. The computer program product of claim 44, wherein the depth-enhanced virtual reality image comprises a combination of a captured image and a computer-generated image.

47. The computer program product of claim 44, wherein:
the depth-assigned content item is assigned to a location within the depth-enhanced virtual reality image; and
the computer program code configured to cause at least one processor to render the depth-enhanced virtual reality image to generate a rendered image including the depth-assigned content item comprises computer program code configured to cause at least one processor to render the depth-assigned content item at the location to which it is assigned.

48. The computer program product of claim 44, wherein the computer program code configured to cause at least one processor to determine whether to include the depth-assigned content item in rendering the depth-enhanced virtual reality image comprises computer program code configured to cause at least one processor to determine whether the first depth value equals the determined focus depth.

49. The computer program product of claim 44, wherein the computer program code configured to cause at least one processor to render the depth-enhanced virtual reality image to generate a rendered image including the depth-assigned content item comprises:
the computer program code configured to cause at least one processor to, responsive to the first depth value falling outside the predetermined tolerance value of the determined focus depth, render the depth-enhanced virtual reality image to generate a rendered image including a subdued representation of the depth-assigned content item.

50. The computer program product of claim 44, wherein the depth-assigned content item comprises at least one selected from the group consisting of:
a tag;
an annotation;
a comment;

a text item;
an image;
an interactive element;
a hyperlink;
a reference to a document;
a reference to a resource;
a machine-readable code; and
a Quick Response (QR) code.

51. The computer program product of claim 44, further comprising computer program code, encoded on the medium, configured to cause at least one processor to perform the steps of:
receiving, via a user input device, user input indicating an interaction with the depth-enhanced virtual reality image; and
responsive to the interaction with the depth-enhanced virtual reality image, causing a change to the depth-assigned content item.

52. The computer program product of claim 44, further comprising computer program code, encoded on the medium, configured to cause at least one processor to perform the steps of:
receiving, via a user input device, user input indicating an interaction with the depth-assigned content item; and
responsive to the interaction with the depth-enhanced virtual reality image, causing a change to the depth-enhanced virtual reality image.

53. The computer program product of claim 44, wherein the depth-assigned content item is associated with an additional content item, the computer program code further comprising computer program code, encoded on the medium, configured to cause at least one processor to perform the steps of:
receiving, via a user input device, user input indicating an interaction with the depth-assigned content item; and
responsive to the interaction with the depth-enhanced virtual reality image, causing a change to the additional content item.

54. The computer program product of claim 44, further comprising computer program code, encoded on the medium, configured to cause at least one processor to perform the steps of:
receiving an indication of popularity of a depth-assigned content item in a social networking environment; and
responsive to the received indication, causing a change to the depth-enhanced virtual reality image.

55. The computer program product of claim 44, wherein the depth-assigned content, when included, selectively obscures an element of the virtual reality image, and wherein the computer program code configured to cause at least one processor to determine whether to include the depth-assigned content item in rendering the depth-enhanced virtual reality image comprises computer program code configured to cause at least one processor to determine whether a user is not authorized to view the element.

56. The computer program product of claim 44, wherein the computer program code configured to cause at least one processor to determine whether to include the depth-assigned content item in rendering the depth-enhanced virtual reality image comprises computer program code configured to cause at least one processor to determine whether a user is authorized to view the depth-assigned content.

57. The computer program product of claim 44, further comprising computer program code, encoded on the medium, configured to cause at least one processor to perform the steps of:
receiving a predefined sequence of display depths; and
successively presenting the depth-enhanced virtual reality image at each display depth in the received sequence.

58. The computer program product of claim 44, wherein the computer program code configured to cause at least one processor to determine whether to include the depth-assigned content item in rendering the depth-enhanced virtual reality image comprises computer program code configured to cause at least one processor to determine readiness of a user to view the depth-assigned content item.

59. The computer program product of claim 58, wherein the computer program code configured to cause at least one processor to determine readiness of a user to view the depth-assigned content item comprises computer program code configured to cause at least one processor to determine direction of user gaze to determine which portion of a plurality of portions of a related content item is currently being viewed by a user.

60. The computer program product of claim 58, wherein the computer program code configured to cause at least one processor to determine whether to include the depth-assigned content item in rendering the depth-enhanced virtual reality image comprises computer program code configured to cause at least one processor to perform the steps of:
determining at least one affinity between the user and at least one other entity; and
determining whether to include the depth-assigned content item based on at least one reaction of the at least one other entity to the depth-assigned content item.

61. The computer program product of claim 44, further comprising computer program code, encoded on the medium, configured to cause at least one processor to perform the steps of, prior to receiving the depth-enhanced virtual reality image:
associating at least one content item with a depth-enhanced virtual reality image; and
assigning each content item to at least one depth value.

62. A system for manipulating depth-assigned content associated with a depth-enhanced virtual reality image, comprising:
a processor, configured to:
receive a depth-enhanced virtual reality image comprising a plurality of elements having different depth values;
receive a depth-assigned content item, the depth-assigned content item being associated with the depth-enhanced virtual reality image and being assigned to a first depth value;
determine a focus depth for rendering of the depth-enhanced virtual reality image, wherein at least a first one of the elements has a depth that is closer to the focus depth than the depth of at least a second one of the elements; and
determine whether to include the depth-assigned content item in rendering the depth-enhanced virtual reality image based on a determination as to whether the first depth value falls within a predetermined tolerance value of the determined focus depth;
an image renderer, communicatively coupled to the processor, configured to:
render the depth-enhanced virtual reality image so that the first element is more in focus than the second element;
responsive to the determination indicating that the depth-assigned content item should be included, include the depth-assigned content item in the rendered depth-enhanced virtual reality image; and responsive to the determination indicating that the depth-assigned content item should not be included, omit the depth-assigned content item from the rendered depth-enhanced virtual reality image; and an output device, communicatively coupled to the image rendered, configured to output the rendered depth-enhanced virtual reality image.

63. The system of claim 62, wherein the depth-enhanced virtual reality image comprises a computer-generated image.

64. The system of claim 62, wherein the depth-enhanced virtual reality image comprises a combination of a captured image and a computer-generated image.

65. The system of claim 62, wherein:

the depth-assigned content item is assigned to a location within the depth-enhanced virtual reality image; and the image renderer is configured to render the depth-enhanced virtual reality image to generate a rendered image including the depth-assigned content item at the location to which it is assigned.

66. The system of claim 62, wherein the processor is configured to determine whether to include the depth-assigned content item in rendering the depth-enhanced virtual reality image by determining whether the first depth value equals the determined focus depth.

67. The system of claim 62, wherein the image renderer is configured to, responsive to the first depth value falling outside the predetermined tolerance value of the determined focus depth, render the depth-enhanced virtual reality image to generate a rendered image including a subdued representation of the depth-assigned content item.

68. The system of claim 62, wherein the depth-assigned content item comprises at least one selected from the group consisting of:

a tag;
an annotation;
a comment;
a text item;
an image;
an interactive element;
a hyperlink;
a reference to a document;
a reference to a resource;
a machine-readable code; and
a Quick Response (QR) code.

69. The system of claim 62, further comprising:

a user input device, configured to receive user input indicating an interaction with the depth-enhanced virtual reality image;

wherein the processor is configured to, responsive to the interaction with the depth-enhanced virtual reality image, cause a change to the depth-assigned content item.

70. The system of claim 62, further comprising:

a user input device, configured to receive user input indicating an interaction with the depth-assigned content item;

wherein the processor is configured to, responsive to the interaction with the depth-enhanced virtual reality image, cause a change to the depth-enhanced virtual reality image.

71. The system of claim 62, wherein the depth-assigned content item is associated with an additional content item, the system further comprising:

a user input device, configured to receive user input indicating an interaction with the depth-assigned content item;

wherein the processor is configured to, responsive to the interaction with the depth-enhanced virtual reality image, cause a change to the additional content item.

72. The system of claim 62, wherein the processor is further configured to:

receive an indication of popularity of a depth-assigned content item in a social networking environment; and responsive to the received indication, cause a change to the depth-enhanced virtual reality image.

73. The system of claim 62, wherein the depth-assigned content, when included, selectively obscures an element of the virtual reality image, and wherein the processor is configured to determine whether to include the depth-assigned content item in rendering the depth-enhanced virtual reality image by determining whether a user is not authorized to view the element.

74. The system of claim 62, wherein the processor is configured to determine whether to include the depth-assigned content item in rendering the depth-enhanced virtual reality image by determining whether a user is authorized to view the depth-assigned content.

75. The system of claim 62, wherein:

the processor is configured to receive a predefined sequence of display depths; and the output device is configured to successively present the depth-enhanced virtual reality image at each display depth in the received sequence.

76. The system of claim 62, wherein the processor is configured to determine whether to include the depth-assigned content item in rendering the depth-enhanced virtual reality image by determining readiness of a user to view the depth-assigned content item.

77. The system of claim 76, wherein the processor is configured to determine readiness of a user to view the depth-assigned content item by determining direction of user gaze to determine which portion of a plurality of portions of a related content item is currently being viewed by a user.

78. The system of claim 76, wherein the processor is configured to determine whether to include the depth-assigned content item in rendering the depth-enhanced virtual reality image by:

determining at least one affinity between the user and at least one other entity; and determining whether to include the depth-assigned content item based on at least one reaction of the at least one other entity to the depth-assigned content item.

79. The system of claim 62, wherein the processor is configured to, prior to receiving the depth-enhanced virtual reality image:

associate at least one content item with a depth-enhanced virtual reality image; and assign each content item to at least one depth value.

* * * * *